(12) United States Patent
Fuxman et al.

(10) Patent No.: US 10,146,768 B2
(45) Date of Patent: Dec. 4, 2018

(54) AUTOMATIC SUGGESTED RESPONSES TO IMAGES RECEIVED IN MESSAGES USING LANGUAGE MODEL

(71) Applicant: Google LLC, Mountain View, CA (US)

(72) Inventors: Ariel Fuxman, San Francisco, CA (US); Vivek Ramavajjala, Mountain View, CA (US); Ning Ye, Palo Alto, CA (US); John Patrick McGregor, Jr., Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/415,506

(22) Filed: Jan. 25, 2017

(65) Prior Publication Data

US 2018/0210874 A1    Jul. 26, 2018

(51) Int. Cl.
*G06K 9/46*     (2006.01)
*G06F 17/27*    (2006.01)
*G06K 9/48*     (2006.01)

(52) U.S. Cl.
CPC .......... *G06F 17/2785* (2013.01); *G06K 9/481* (2013.01)

(58) Field of Classification Search
CPC .................. G06F 17/2785; G06K 9/726
See application file for complete search history.

(56) References Cited

U.S. PATENT DOCUMENTS

| 8,391,618 | B1 | 3/2013 | Chuang et al. |
| 8,423,577 | B1 | 4/2013 | Lee et al. |
| 8,515,958 | B2 | 8/2013 | Knight |
| 8,688,698 | B1 | 4/2014 | Black et al. |
| 8,825,474 | B1 | 9/2014 | Zhai et al. |

(Continued)

FOREIGN PATENT DOCUMENTS

| EP | 2560104 | 2/2013 |
| EP | 2688014 | 1/2014 |
| EP | 3091445 | 11/2016 |

OTHER PUBLICATIONS

Kannan, et al., "Smart Reply: Automated Response Suggestions for Email", Aug. 13, 2016.*

(Continued)

*Primary Examiner* — Phuoc Tran
(74) *Attorney, Agent, or Firm* — IP Spring

(57) ABSTRACT

Implementations relate to automatic response suggestions to images included in received messages. In some implementations, a computer-implemented method includes detecting an image posted within a first message by a first user, and programmatically analyzing the image to determine a feature vector representative of the image. The method programmatically generates one or more suggested responses to the first message based on the feature vector, each suggested response being a conversational reply to the first message. Generating the suggested responses includes determining probabilities associated with word sequences for the feature vector using a model trained with previous responses to previous images, and selecting one or more of the word sequences based on the associated probabilities. The suggested responses are determined based on the selected word sequences. The method causes the suggested responses to be rendered in the messaging application as one or more suggestions to a second user.

20 Claims, 8 Drawing Sheets

(56) References Cited

U.S. PATENT DOCUMENTS

| | | | |
|---|---|---|---|
| 8,996,639 | B1 | 3/2015 | Faaborg et al. |
| 9,191,786 | B2 | 11/2015 | Davis |
| 9,674,120 | B2 | 6/2017 | Davis |
| 9,715,496 | B1 | 7/2017 | Sapoznik et al. |
| 9,805,371 | B1 | 10/2017 | Sapoznik et al. |
| 9,807,037 | B1 | 10/2017 | Sapoznik et al. |
| 9,817,813 | B2 | 11/2017 | Faizakof et al. |
| 2003/0105589 | A1 | 6/2003 | Liu et al. |
| 2007/0094217 | A1 | 4/2007 | Ronnewinkel |
| 2009/0076795 | A1 | 3/2009 | Bangalore et al. |
| 2009/0119584 | A1 | 5/2009 | Herbst |
| 2009/0282114 | A1 | 11/2009 | Feng et al. |
| 2011/0252108 | A1 | 10/2011 | Morris et al. |
| 2012/0245944 | A1 | 9/2012 | Gruber et al. |
| 2014/0088954 | A1 | 3/2014 | Shirzadi et al. |
| 2014/0163954 | A1 | 6/2014 | Joshi et al. |
| 2014/0164506 | A1 | 6/2014 | Tesch et al. |
| 2014/0237057 | A1 | 8/2014 | Khodorenko |
| 2014/0317030 | A1 | 10/2014 | Shen et al. |
| 2015/0006143 | A1 | 1/2015 | Skiba et al. |
| 2015/0032724 | A1 | 1/2015 | Thirugnanasundaram et al. |
| 2015/0178371 | A1 | 6/2015 | Seth et al. |
| 2015/0178388 | A1 | 6/2015 | Winnemoeller et al. |
| 2015/0207765 | A1 | 7/2015 | Brantingham et al. |
| 2015/0248411 | A1 | 9/2015 | Krinker et al. |
| 2015/0250936 | A1 | 9/2015 | Thomas et al. |
| 2015/0302301 | A1 | 10/2015 | Petersen |
| 2016/0042252 | A1 | 2/2016 | Sawhney et al. |
| 2016/0140447 | A1 | 5/2016 | Cohen et al. |
| 2016/0179816 | A1 | 6/2016 | Glover |
| 2016/0210279 | A1* | 7/2016 | Kim .................. G06F 17/279 |
| 2016/0342895 | A1* | 11/2016 | Gao .................. G06F 17/2881 |
| 2016/0350304 | A1 | 12/2016 | Aggarwal et al. |
| 2017/0075878 | A1 | 3/2017 | Jon et al. |
| 2017/0098122 | A1* | 4/2017 | el Kaliouby .......... A61B 5/744 |
| 2017/0149703 | A1 | 5/2017 | Willett et al. |
| 2017/0153792 | A1 | 6/2017 | Kapoor et al. |
| 2017/0171117 | A1 | 6/2017 | Carr et al. |
| 2017/0180276 | A1 | 6/2017 | Gershony et al. |
| 2017/0180294 | A1 | 6/2017 | Milligan et al. |
| 2017/0293834 | A1 | 10/2017 | Raison et al. |
| 2017/0324868 | A1 | 11/2017 | Tamblyn et al. |
| 2017/0344224 | A1 | 11/2017 | Kay et al. |
| 2018/0005272 | A1* | 1/2018 | Todasco ............ G06Q 30/0269 |
| 2018/0012231 | A1 | 1/2018 | Sapoznik et al. |
| 2018/0013699 | A1 | 1/2018 | Sapoznik et al. |

OTHER PUBLICATIONS

Fuxman, Ariel, ""Aw, so cute!": Allo helps you respond to shared photos", May 18, 2016, 6 pages.*

Fuxman, Ariel, ""Aw, so cute!": Allo helps you respond to shared photos", Google Research Blog, https://research.googleblog.com/2016/05/aw-so-cute-allo-helps-you-respond-to.html, May 18, 2016, 6 pages.

Vinyals, O. et al., "Show and Tell: A Neural Image Caption Generator", arXiv:1411.4555v2 [cs.CV], Apr. 20, 2015, pp. 1-9.

EPO, International Search Report and Written Opinion for International Patent Application No. PCT/US2016/068083, dated Mar. 9, 2016, 13 pages.

EPO, International Search Report for International Patent Application No. PCT/US2017/052349, dated Dec. 13, 2017, 5 pages.

EPO, Written Opinion for International Patent Application No. PCT/US2017/052349, dated Dec. 13, 2017, 6 pages.

Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.

Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.

Russell, "Google Allo is the Hangouts Killer We've Been Waiting for", Retrieved from the Internet: http://web.archive.org/web/20160519115534/https://vvvvvv.technobuffalo.com/2016/05/18/google-allo-hangouts-replacement/, May 18, 2016, 3 pages.

USPTO, Non-final Office Action for U.S. Appl. No. 15/709,418, dated Nov. 21, 2017, 15 pages.

EPO, Communication Pursuant to Rules 161(1) and 162 EPC for European Patent Application No. 16788835.3, dated Nov. 23, 2017, 2 pages.

EPO, International Search Report for International Patent Application No. PCT/US2017/057044, dated Jan. 18, 2018, 5 pages.

EPO, Written Opinion for International Patent Application No. PCT/US2017/057044, dated Jan. 18, 2018, 5 pages.

USPTO, Notice of Allowance for U.S. Appl. No. 15/709,418, dated Mar. 1, 2018, 11 pages.

EPO, Written Opinion of the International Preliminary Examining Authority for International Patent Application No. PCT/US2017/052349, dated Aug. 6, 2018, 9 pages.

USPTO, First Action Interview, Pre-Interview Communication for U.S. Appl. No. 15/350,040, dated Jul. 16, 2018, 5 pages.

WIPO, International Preliminary Report on Patentability for International Patent Application No. PCT/US2016/068083, dated Jul. 5, 2018, 9 pages.

USPTO, First Action Interview, Pre-Interview Communication for U.S. Appl. No. 16/003,661, dated Aug. 29, 2018, 6 pages.

* cited by examiner

AUTOMATIC SUGGESTED RESPONSES TO IMAGES RECEIVED IN MESSAGES USING LANGUAGE MODEL

BACKGROUND

The popularity and convenience of digital mobile devices as well as the widespread of use of Internet communications have caused communications between user devices to become ubiquitous. For example, users commonly use their devices to send electronic messages to other users as text messages, chat messages, email, etc. Users may send images in messages to other users to provide receiving users with visual content.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatic response suggestions to images included in received messages. In some implementations, a computer-implemented method includes detecting an image posted within a first message by a first user, and programmatically analyzing the image to determine a feature vector representative of the image. The method programmatically generates one or more suggested responses to the first message based on the feature vector, the one or more suggested responses each being a conversational reply to the first message. Programmatically generating the one or more suggested responses includes determining probabilities associated with word sequences for the feature vector using a model trained with previous responses to previous images, and selecting one or more word sequences of the word sequences based on the probabilities associated with the word sequences. The one or more suggested responses are determined based on the one or more selected word sequences. The method causes the one or more suggested responses to be rendered in the messaging application as one or more suggestions to a second user.

Various implementations and examples of the method are described. For example, in some implementations, providing the one or more suggested responses includes transmitting a command to render the one or more suggested responses in the messaging application. In some implementations, the probabilities include a probability of each word in a stored vocabulary to be the next word in one of the one or more word sequences, and where the selecting the one or more word sequences includes selecting a number of the one or more word sequences associated with one or more highest probabilities of the determined probabilities. In some implementations, the model is a conditioned language model and determining the probabilities associated with the word sequences includes inputting the feature vector to the conditioned language model. In some examples, the conditioned language model uses a long-short term memory (LSTM) network. Some implementations select the one or more word sequences using a beam search technique. In some implementations, each of the one or more word sequences is used by the model as a word embedding encoding words included in the word sequence and the feature vector.

In additional example implementations, the one or more word sequences are determined from a plurality of words in a vocabulary that is determined from the previous responses, and determining the probabilities includes iteratively determining, for each word sequence, a probability of each word in the vocabulary to be the next word in the word sequence. In some examples, the previous responses are selected from a larger set of responses to the previous images, wherein the previous responses are more specific to particular content of the previous images than other previous responses of the larger set of responses.

In additional example implementations, the model is a conditioned language model, and selecting the one or more word sequences includes iteratively feeding the feature vector and a previous word sequence to the conditioned language model to determine a set of new word sequences and the probabilities associated with the new word sequences based on the feature vector and the previous word sequence, where one or more of the new word sequences have at least one additional word with respect to the previous word sequence; and selecting a subset of the set of new word sequences based on the probabilities associated with the new word sequences and selecting one word sequence of the selected subset as the previous word sequence for a next iteration.

In additional example implementations, the method further includes, upon the second user selecting the suggested response, posting the suggested response as a message response to the first message. In some implementations, the method further includes checking whether each of the one or more word sequences is present in a whitelist of word sequences, where the selected one or more word sequences are present on the whitelist. Some implementations select at least one word sequence that is weighted based on a similarity to a previous message response provided by the second user. In some implementations, the conditioned language model is provided as a first conditioned language model specific to a first language, and the method includes providing a second conditioned language model specific to a second language, determining that a language for a message conversation in which the first message is received is the first language, and selecting the first conditioned language model to be used in the programmatically generating one or more suggested responses.

In some implementations, a system includes a memory and at least one processor configured to access the memory and configured to perform operations including detecting an image posted within a first message by a first user, and programmatically analyzing the image to determine a feature vector representative of the image. The operations include programmatically generating one or more suggested responses to the first message based on the feature vector, the one or more suggested responses each being a conversational reply to the first message and having one or more words arranged in a word sequence. Programmatically generating the one or more suggested responses includes, for each one of the one or more suggested responses, iteratively determining each word of the one or more words arranged in the word sequence based on the feature vector and based on one or more previous words in the word sequence. The operations include causing the one or more suggested responses to be rendered in the messaging application as one or more suggestions to a second user.

Various implementations and examples of the system are described. For example, in some implementations, the operation of programmatically generating the one or more suggested responses includes determining probabilities associated with the one or more word sequences based on data that includes previous responses to previous images. In some implementations, the operation of programmatically generating the one or more suggested responses includes selecting the one or more suggested responses based on the probabilities associated with the one or more word sequences. In some implementations, the operation of determining the probabilities of the word sequences includes using a conditioned language model that was trained using the data including previous responses to previous images, where the conditioned language model is conditioned by the feature vector received as an input and uses a long-short term memory (LSTM) network.

In some implementations, a non-transitory computer readable medium has stored thereon software instructions that, when executed by a processor, cause the processor to automatically provide suggested content by performing operations. The operations include receiving an image and programmatically analyzing the image to determine a feature vector representative of the image. The operations include programmatically generating one or more suggested responses to the image based on the feature vector, the one or more suggested responses each being a conversational reply to the image and having one or more words arranged in a word sequence. Programmatically generating the one or more suggested responses includes, for each of the one or more suggested responses, iteratively determining each word of the one or more words arranged in the word sequence based on the feature vector and one or more previous words in the word sequence. The operations include outputting the one or more suggested responses to be rendered in an application as one or more suggestions to a user.

Various implementations of the computer readable medium include, for example, the suggested responses being rendered in a messaging application, and in some implementations, the operation of programmatically generating the one or more suggested responses includes determining probabilities associated with the one or more suggested responses using a conditioned language model that was trained based on data that includes previous responses to previous images and that is conditioned by the feature vector received as an input, where the conditioned language model uses a long-short term memory (LSTM) network; and selecting the one or more suggested responses based on the probabilities associated with the one or more suggested responses.

DETAILED DESCRIPTION

Figure 1:
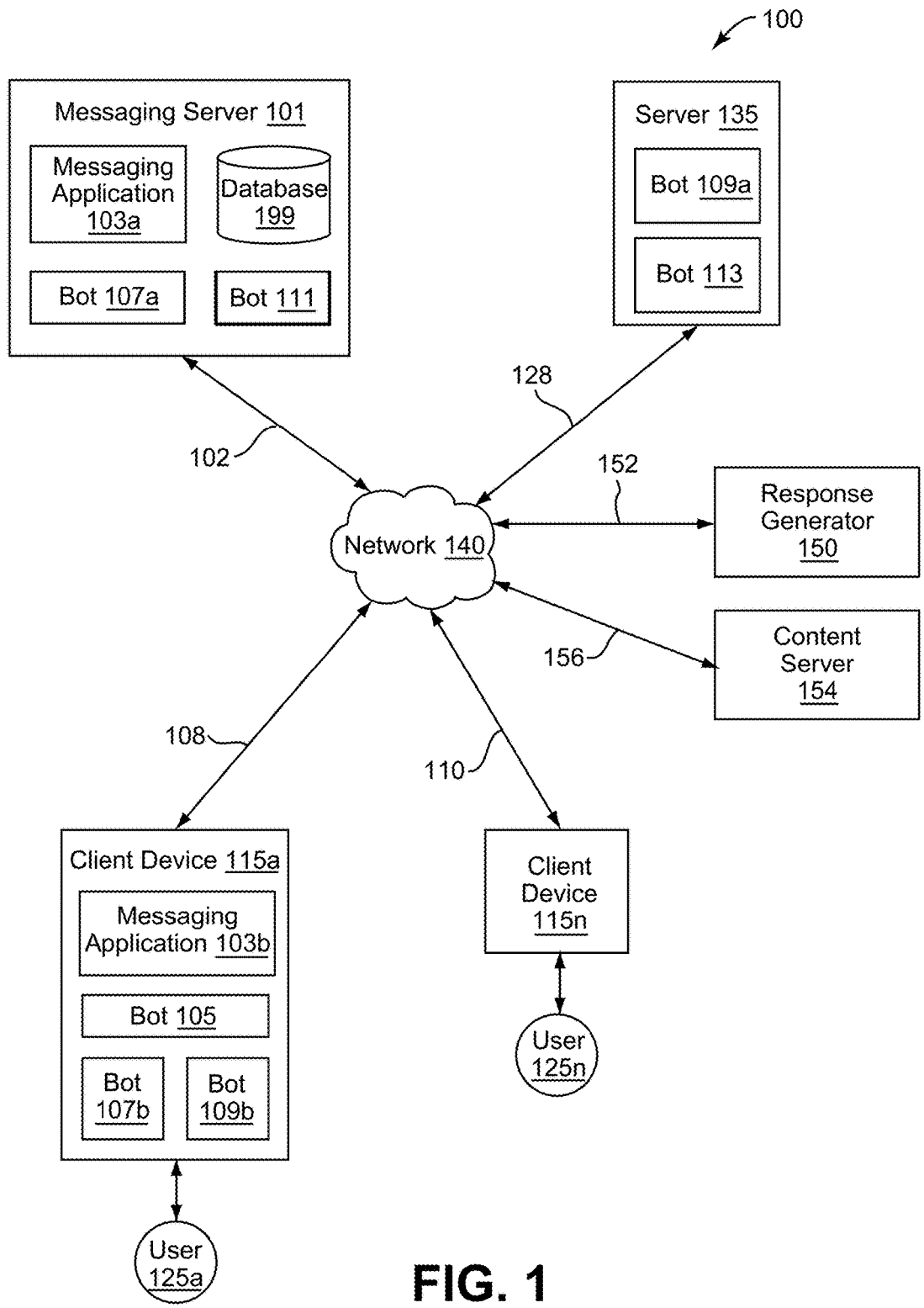
FIG. 1 is a block diagram of example systems and a network environment which may be used for one or more implementations described herein.

One or more implementations described herein relate to automatic response suggestions to images included in received messages. In some implementations, automatically suggesting content in a messaging application includes detecting an image posted within a message by a first user, and programmatically analyzing the image to determine a feature vector representative of the image. The feature vector is used to generating one or more suggested responses to the message, where the suggested responses are conversational replies to the first message. For example, in some implementations, a conditioned language model is trained to determine probabilities associated with word sequences for the feature vector based on training data that includes previous responses to previous images. One or more of the word sequences are selected based on the probabilities, and the suggested responses are based on the selected word sequences. The suggested responses are output, e.g., rendered in the messaging application as one or more suggestions to a second user.

Various features are described. For example, the suggested responses can each have one or more words arranged in a word sequence, and, for each suggested response, each word of the word sequence can be iteratively determined based on the feature vector and based on one or more previous words in the word sequence. The suggested responses can be selected based on probabilities of words to be the next words in word sequences; for example, the suggested responses can be word sequences determined to have the highest probabilities of their component words in sequence among the words of a vocabulary. For example, the one or more word sequences can be determined from a set of words in the vocabulary that is based on the training data, e.g., a set of words obtained from a set of training message data that includes previous message images and previous responses to those images. In some examples, the training data can be filtered such that the previous responses in the training data are more specific to particular content of the previous images than other previous responses that have been filtered.

In various examples, the conditioned language model can use a long-short term memory (LSTM) network. The word sequences can be selected using a beam search technique. In some examples, the system can check whether each of the one or more word sequences is present in a whitelist of word sequences, such that word sequences present on the whitelist are eligible to be suggested responses. In some implementations, after output of the suggested responses, if the second user selects a suggested response, the selected suggested response is sent to the first user as a message response to the first message and image. In some implementations, one or more word sequences are weighted for selection as suggested responses based on similarity to a previous message response provided by the second user in response to receiving a previous image that is similar to the currently-received image. In some implementations, multiple conditioned language models can be provided, each language model associated with a different language. A particular conditioned language model can be selected for determining the suggested responses for the image based on a detected language of a message conversation in which the first message is received. In some implementations, one or more message responses can be determined to be commands or requests to bots, e.g., for information related to the obtained image.

One or more features described herein enable suggested responses to be automatically provided in response to a received image in a message, where the suggested responses are appropriate and relevant as message responses to the content of the received image. For example, features described herein can provide suggested responses that may include appropriate reactions to particular content in images, as if a user were creating the message responses. This provides users with more flexible options in determining their responses in message conversations and may provide options for a user who is otherwise unable to respond to a message adequately.

For example, at various times during a message conversation, users may not be able to provide sufficient attention and/or focus to respond to received messages with pertinent responses, and/or may not be able to provide detailed user input to a user device to create such pertinent responses. In some examples, a user may be performing an activity or be in an environment where appropriate responses are not possible or more difficult for the user to provide. One or more features described herein advantageously provide automatic message suggestions for a user in response to an image. For example, one or more automatic message responses are automatically suggested based on an image received in a messaging conversation between user devices, and the user may simply select a desired response from the suggestions for posting in the conversation. The message suggestions are relevant to the received image and allow a user to simply and quickly respond to received images with reduced user input and reduced time to compose the responses on a device, thus reducing consumption of device resources that would otherwise be needed to display a large set of possible responses and/or reducing consumption of device resources needed to enable and process added input from the user to compose responses, search through, edit, or complete suggested responses, and/or otherwise participate in conversations held via electronic devices. Consequently, a technical effect of one or more described implementations is that creation and transmission of responses in device-implemented conversations is achieved with less computational time and resources expended to obtain results. For example, a technical effect of described techniques and features is a reduction in the consumption of system processing resources utilized to display, create, and send message responses as compared to a system that does not provide one or more of the described techniques or features.

Prior techniques may determine suggested responses to images, e.g., based on recognizing one or more objects or features in an image, e.g., in response to recognizing that the image includes an apple, a suggested response may be provided that corresponds to such recognition. However, many such techniques may fail to provide a suggestion, e.g., for images in which no objects are recognized. Further, some of these techniques may provide inaccurate suggestions, e.g., if the object recognition is erroneous, or incomplete. Additionally, when more than one object is recognized in an image, e.g., an apple and a knife, some of these techniques may produce simple responses that list the objects, e.g., "An apple and a knife," or responses that are unlikely to be selected by a user.

The techniques described herein overcome these and other deficiencies. For example, the techniques may provide a greater variety and/or quality of suggested response(s). For example, the techniques described herein feed an image feature vector determined directly from pixels of an obtained image to a trained neural network to produce responses. Such a neural network can provide responses for any type of image, without the need to specifically recognize objects in an image. Further, use of a model trained based on image pixels may permit a wider variety in responses than techniques that depend on recognizing objects and using predefined labels associated with those objects. For example, in some implementations, the vocabulary from which words in suggested responses are selected may include words from multiple languages, human expressions that may not be words in a dictionary (e.g., "aww," "!!!" etc.), other types of symbols (e.g., emojis, stickers, etc.), a different image, or a combination. Additionally, techniques described herein may provide response suggestions that are more likely to be selected by a user, since these may be more natural than response suggestions that are constructed based on recognized image features. Thus, another technical effect of described techniques and features is a reduction in the consumption of system processing resources utilized to create and send message responses as compared to a system that does not provide one or more of the described techniques or features, e.g., a system that uses prior techniques of content recognition in which additional computational resources are needed to display a larger set of potentially relevant suggested responses and/or to receive input from the user required to specify, select, edit, or create responses that a user is to transmit.

Described techniques provide additional advantages. For example, use of a whitelist of responses in some implementations allows particular types of responses to be removed from suggestions, allowing response suggestions to be more likely to be selected by a user. Furthermore, in some implementations, techniques described herein utilize a beam search, which can advantageously evaluate a large number of possible word sequences based on the image feature vector with reduced use of computational resources. In some implementations, described techniques may determine, based on the image feature vector, that the image is not eligible to provide suggestions, and may not conduct carry out computational steps to generate responses, thereby saving computational resources. In some implementations where users permit such use of data, the language model may be retrained, e.g., periodically, based on additional training data and user selections, and therefore can provide improved suggestions based on such retraining.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

An "image" as referred to herein is a digital image having pixels with one or more pixel values (e.g., color values, brightness values, etc.). An image can be a still image or single image, or can be an image included in a series of images, e.g., a frame in a video sequence of video frames, or an image in a different type of sequence or animation of images. For example, implementations described herein can be used with single images, video sequences of images, or animated images (e.g., cinemagraphs or other animations).

FIG. 1 illustrates a block diagram of an example environment 100 for providing messaging services that enable and, in some embodiments, provide automatic assistive agents, e.g., bots. The exemplary environment 100 includes messaging server 101, one or more client devices 115a, 115n, server 135, response suggestion generator 150, and network 140. Users 125a-125n may be associated with respective client devices 115a, 115n. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, messaging server 101, client devices 115, server 135, and response generator 150 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network. Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. Although FIG. 1 illustrates one network 140 coupled to client devices 115, messaging server 101, and server 135, in practice one or more networks 140 may be coupled to these entities.

Messaging server 101 may include a processor, a memory, and network communication capabilities. In some implementations, messaging server 101 is a hardware server. In some implementation, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115a-115n, server 135, response generator 150, and bot 113 via network 140. In some implementations, messaging server 101 may include messaging application 103a that provides client functionality to enable a user (e.g., any of users 125) to exchange messages with other users and/or with a bot. Messaging application 103a may be a server application, a server module of a client-server application, or a distributed application (e.g., with a corresponding client messaging application 103b on one or more client devices 115).

Messaging server 101 may also include database 199 which may store messages exchanged via messaging server 101, data and/or configuration of one or more bots, information provided by content classifier 130, and user data associated with one or more users 125, all upon explicit permission from a respective user to store such data. In some embodiments, messaging server 101 may include one or more assistive agents, e.g., bots 107a and 111. In other embodiments, the assistive agents may be implemented on the client devices 115a-n and not on the messaging server 101.

Messaging application 103a may be code and routines operable by the processor to enable exchange of messages among users 125 and one or more bots 105, 107a, 107b, 109a, 109b, 111, and 113. In some implementations, messaging application 103a may be implemented using hardware including a field-programmable gate array (FPGA) or an application-specific integrated circuit (ASIC). In some implementations, messaging application 103a may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. In some implementations, messages are stored. In some implementations, database 199 may further store data and/or configuration of one or more bots, e.g., bot 107a, bot 111, etc. In some implementations when a user 125 provides consent for storage of user data (such as social network data, contact information, images, etc.) database 199 may also store user data associated with the respective user 125 that provided such consent.

In some implementations, messaging application 103a/103b may provide a user interface that enables a user 125 to create new bots. In these implementations, messaging application 103a/103b may include functionality that enables user-created bots to be included in conversations between users of messaging application 103*a*/103*b*.

Response generator 150 may include a processor, a memory and network communication capabilities. In some implementations, response generator 150 is a hardware server. Response generator 150 is communicatively coupled to the network 140 via signal line 152. Signal line 152 may be a wired connection, such as Ethernet, coaxial cable, fiber-optic cable, etc., or a wireless connection, such as Wi-Fi, Bluetooth, or other wireless technology. In some implementations, response generator 150 sends and receives data to and from one or more of the messaging server 101 and the client devices 115*a*-115*n* via the network 140. Although response generator 150 is illustrated as being one server, multiple response generators 150 are possible. In some implementations, the response generator 150 can be included in one or more other components of the environment 100, e.g., messaging server 101, client device 115*a*, server 135, content server 154, etc.

The response generator 150 determines and provides one or more suggested responses in reply to a particular image. For example, the suggested responses can be provided to the messaging server 101 and/or the messaging application of one or more client devices 115. The response generator can use machine learning, e.g., use a conditioned language model that utilizes machine learning to determine the suggested responses. For example, the response generator can be trained using training data (e.g., message training data) of images and correct, actual, and/or desired responses to the images in a messaging application context, and the response generator can then determine responses to new images it receives. For example, the conditioned language model can be trained using synthetic data, e.g., data that is automatically generated by a computer, with no use of user information. In some implementations, the conditioned language model can be trained based on sample data, e.g., sample message data, for which permissions to utilize user data for training have been obtained expressly from users providing the message data. For example, sample data may include received messages and responses that were sent to the received messages. Based on the sample data, the model can predict responses to received messages, which may then be provided as suggested responses. In some implementations, the response generator 150 can use a Long Short Term Memory (LSTM) network to determine responses as word sequences in which words of the responses are determined iteratively, e.g., one word at a time.

Some implementations can also use detected image features for one or more features, e.g., rankings of suggested responses. For example, image features can include people (without determining identity of the people), animals, objects (e.g., articles, vehicles, etc.), particular monuments, landscape features (e.g., foliage, mountains, lakes, sky, clouds, sunrise or sunset, buildings, bridges, etc.), weather, etc. Various image recognition and detection techniques can be used (e.g., machine learning based on training images, comparison to reference features in reference images, etc.) to detect image features.

Response generator 150 may be managed by the same party that manages the messaging server 101, or may be managed by a third-party. In some implementations, response generator 150 hosts bots. The bots may be computer programs that perform specific functions to provide suggestions, for example, a reservation bot makes reservations, an auto-reply bot generates reply message text, a scheduling bot automatically schedules calendar appointments, etc. Response generator 150 may provide or refer one or more bots as suggested responses to the messaging application 103. For example, the code for the bot may be incorporated into the messaging application 103, or the messaging application 103 may send requests to a bot implemented at response generator 150. In some implementations, the messaging application 103 acts as an intermediary between the user 125 and response generator 150 by providing response generator 150 with bot commands and receiving suggestions based on the bot commands.

In some implementations, a content server 154 can be provided in the environment 100, e.g., as a hardware server, and may include a processor, a memory and network communication capabilities. The content server 154 can be coupled to the network 140 via one or more network connections 156. In some implementations, the content classifier may provide information to the messaging application 103. For example, content server 154 may maintain an electronic encyclopedia, a knowledge graph, one or more databases, a social network application (e.g., a social graph, a social network for friends, a social network for business, etc.), a website for a place or location (e.g., a restaurant, a car dealership, etc.), a mapping application (e.g., a website that provides directions), etc. For example, the content server 154 may receive a request for information from the messaging application 103, perform a search, and provide the information in the request. In some implementations, content server 154 may include classifiers of particular types of content in images, and can determine whether any of particular classes are detected in the content (e.g., pixels) of the image. In some examples, the messaging application 103 may request driving directions or an estimated time of arrival from a mapping application accessed by content server 154.

In some implementations, if a user consents to the use of such data, the content server 154 may provide the messaging application 103 with profile information or profile images of a user that the messaging application 103 may use to identify a person in an image with a corresponding social network profile. In another example, content server 154 may provide the messaging application 103 with information related to entities identified in the messages used by the messaging application 10, if user consent has been obtained for provided user data. For example, the content server 154 may include or access an electronic encyclopedia that provides information about landmarks identified in the images, an electronic shopping website that provides information for purchasing entities identified in the messages, an electronic calendar application that provides, subject to user consent, an itinerary from a user identified in a message, a mapping application that provides information about nearby locations where an entity in the message can be visited, a website for a restaurant where a dish mentioned in a message was served, etc. In some implementations, the content server 154 may communicate with the response generator 150 to obtain information. The content server 154 may provide requested information to the response generator 150.

In some implementations, the response generator 150 and/or content server 154 may receive information from the messaging application 103, e.g., to update databases used or maintained by these modules. For example, where the content server 154 maintains a website about a restaurant, the messaging application 103 may provide the content server 154 with updated information about the restaurant, such as a user's favorite dish at the restaurant.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115a is coupled to the network 140 via signal line 108 and client device 115n is coupled to the network 140 via signal line 110. Signal lines 108 and 110 may be wired connections, e.g., Ethernet, or wireless connections, such as Wi-Fi, Bluetooth, or other wireless technology. Client devices 115a, 115n are accessed by users 125a, 125n, respectively. The client devices 115a, 115n in FIG. 1 are used by way of example. While FIG. 1 illustrates two client devices, 115a and 115n, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 can be a smartwatch. In various implementations, user 125 may view messages from the messaging application 103a/103b on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103b is stored on a client device 115a. In some implementations, messaging application 103b (e.g., a thin-client application, a client module, etc.) may be a client application stored on client device 115a with a corresponding a messaging application 103a (e.g., a server application, a server module, etc.) that is stored on messaging server 101. For example, messaging application 103b may transmit messages created by user 125a on client device 115a to messaging application 103a stored on messaging server 101.

In some implementations, messaging application 103a may be a standalone application stored on messaging server 101. A user 125a may access the messaging application 103a via a web page using a browser or other software on client device 115a. In some implementations, messaging application 103b that is implemented on the client device 115a may include the same or similar modules as that are included on messaging server 101. In some implementations, messaging application 103b may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107a and bot 111.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109a and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103a/103b.

In some implementations, server 135 provides or hosts bots. A bot is an automated service, implemented on one or more computers, that users interact with primarily through text, e.g., via messaging application 103a/103b. Bots are described in greater detail below.

In some implementations, messaging application 103a/103b may provide one or more suggestions, e.g., suggested responses, to users 125 via a user interface, e.g., as a button, or other user interface element. Suggested responses may enable faster interaction, e.g., by reducing or eliminating the need for a user to type a response. Suggested responses may enable users to respond to a message quickly and easily, e.g., when a client device lacks text input functionality (e.g., a smartwatch that does not include a keyboard or microphone). Suggested responses may also enable users to respond quickly to messages, e.g., when the user selects suggested response (e.g., by selecting a corresponding a user interface element on a touchscreen). Suggested responses may be generated using predictive models, e.g., machine learning models, that are trained to generate responses.

For example, messaging application 103a/103b may implement machine learning, e.g., a deep learning model, that can enhance user interaction with messaging application 103. Response generator 150, for example, can utilize machine learning to provide suggestions to a messaging application 103a/103b. In some implementations, machine learning can implemented on one or more other components of the environment 100 and, for example, not using response generator 150. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages and responses that were sent to the received messages. Based on the sample data, the machine-learning model can predict responses to received messages, which may then be provided as suggested responses. User interaction is enhanced, e.g., by reducing burden on the user to compose a response to a received message, by providing a choice of responses that are customized based on the received message and the user's context. For example, when users provide consent, suggested responses may be customized based on the user's prior activity, e.g., earlier messages in a conversation, messages in different conversations, etc. For example, such activity may be used to determine an appropriate suggested response for the user, e.g., a playful response, a formal response, etc. based on the user's interaction style. In another example, when the user specifies one or more preferred languages and/or locales, messaging application 103a/103b may generate suggested responses in the user's preferred language. In various examples, suggested responses may be text responses, images, multimedia, etc.

In some implementations, machine learning, such as using a conditioned language model, may be implemented on response generator 150, and/or on messaging server 101, on client devices 115, both messaging server 101 and client devices 115, etc. In some implementations, a simple machine learning model may be implemented on client device 115 (e.g., to permit operation of the model within memory, storage, and processing constraints of client devices) and a complex machine learning model may be implemented on messaging server 101 and/or response generator 150. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, server 135, or other client devices 115.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a conversation provide consent to use of conversation data, suggestions may include suggested responses to incoming messages that are based on conversation content. For example, if a first user of two users that have consented to suggestions based on conversation content, sends a message "do you want to grab a bite? How about Italian?" a response may be suggested to the second user, e.g., "@assistant lunch, italian, table for 2." In this example, the suggested response includes a bot (identified by the symbol @ and bot handle assistant). If the second user selects this response, the assistant bot is added to the conversation and the message is sent to the bot. A response from the bot may then be displayed in the conversation, and either of the two users may send further messages to the bot. In this example, the assistant bot is not provided access to the content of the conversation, and suggested responses are generated by the messaging application 103.

In certain implementations, the content of a suggested response may be customized based on whether a bot is already present in a conversation or is able to be incorporated into the conversation. For example, if it is determined that a travel bot could be incorporated into the messaging app, a suggested response to a question about the cost of plane tickets to France could be "Let's ask travel bot!"

In different implementations, suggestions, e.g., suggested responses as described herein, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), message stickers, etc. In some implementations, suggested responses may be formatted and/or styled, e.g., using colors, fonts, layout, etc. For example, a suggested response that includes a movie recommendation may include descriptive text about the movie, an image from the movie, and a link to buy tickets. In different implementations, suggested responses may be presented as different types of user interface elements, e.g., text boxes, information cards, etc.

In various implementations, users are offered control over whether they receive suggested responses, what types of suggested responses they receive, a frequency of the suggested responses, etc. For example, users may decline to receive suggested responses altogether, or may choose specific types of suggested responses, or to receive suggested responses only during certain times of day. In another example, users may choose to receive personalized suggested responses. In this example, machine learning may be used to provide suggested responses, based on the user's preferences relating to use of their data and use of machine learning techniques.

Figure 2:
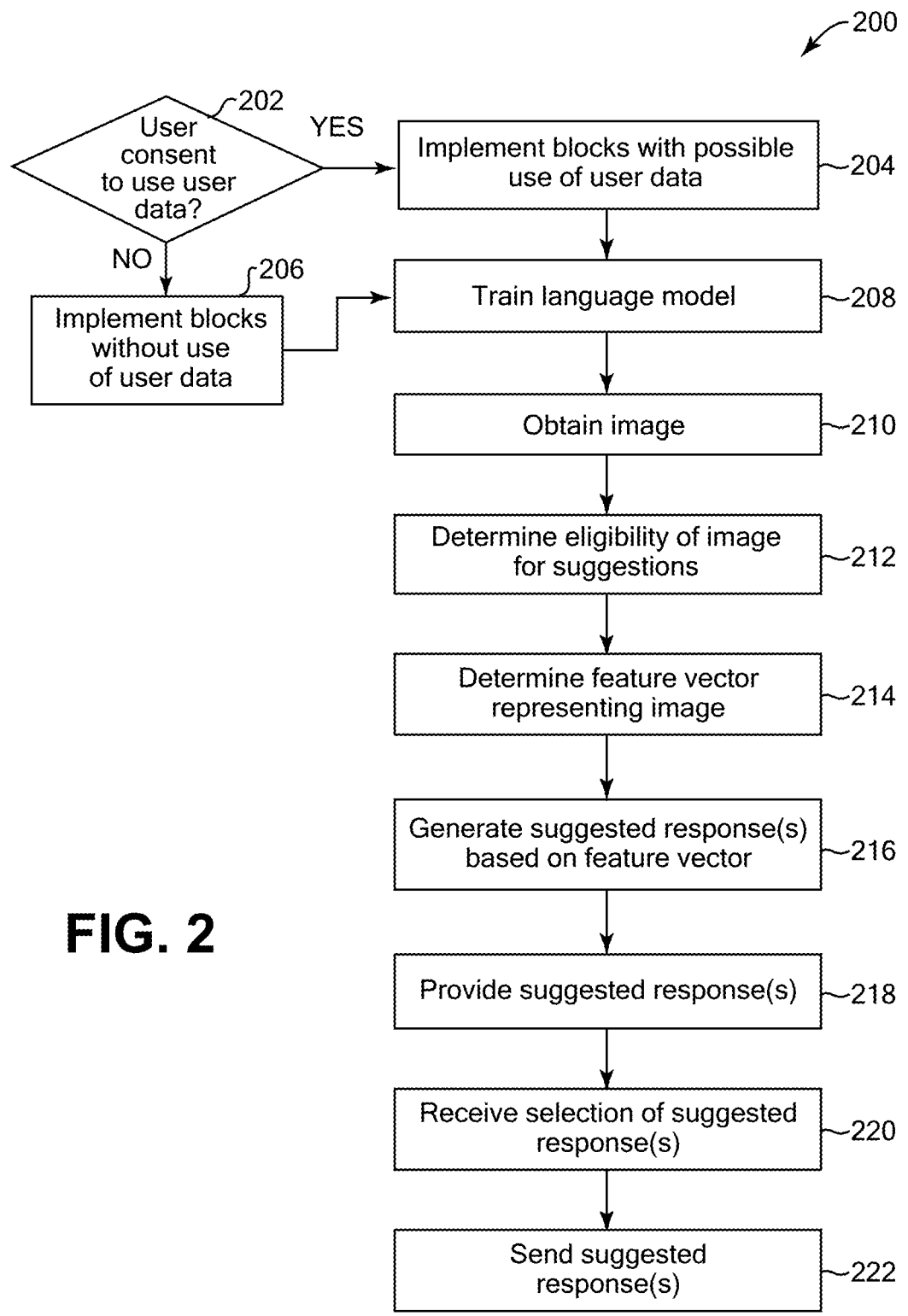
FIG. 2 is a flow diagram illustrating an example method to provide suggested responses to a message including an image, according to some implementations.

FIG. 2 is a flow diagram illustrating an example method 200 to provide suggested responses to a message including an image, according to some implementations. In some implementations, method 200 can be implemented, for example, on a server system 102, e.g., messaging server 101, as shown in FIG. 1. In some implementations, some or all of the method 200 can be implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

In block 202, it is checked whether user consent (e.g., user permission) has been obtained to use user data in the implementation of method 200 (and including use of user data in the method 300 of FIG. 3, described below). For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 210. If user consent has not been obtained, it is determined in block 206 that blocks are to be implemented without use of user data, and the method continues to block 210. In some implementations, if user consent has not been obtained, blocks are to be implemented without use of user data and with synthetic data and/or generic or publicly-accessible and publicly-usable data.

Implementations described herein may provide message suggestions based on an image. Message suggestions may be provided in a variety of contexts. For example, message suggestions may be provided in response to receiving an image on a client device 115a of a particular user (e.g., user 125a) from any of user devices 115, e.g., by a messaging application 103. For example, messaging application 103 may be an instant messaging application, a social network application, an email application, a multimedia messaging application, and the like. Message suggestions may be generated and provided to the particular user automatically, upon consent from the particular user and one or more other users that sent and/or received the image. For example, if the messaging application is an instant messaging application, an image may be received as part of an instant messaging communication between the particular use 125*a* and one or more other users 125, e.g., in a messaging session (e.g., chat) having two participants, in a group messaging session that includes more than two participants, etc. In various implementations, one or more of the users may be bots. In some implementations, bots may be automated agents that are implemented in software and/or hardware. In some implementations, bots may represent or be associated with cameras (e.g., security cameras, web cameras, surveillance cameras, etc.), appliances (e.g., a smart refrigerator, an alarm device, an industrial appliance, etc.), imaging devices (e.g., microscopes, medical imaging devices, etc.) and send one or more images via messaging application 103. In the implementations that include one or more of the users that are bots, consent is obtained from an owner or operator of the bot to use messages generated by the bot. In some implementations, consent may be specified as a configuration parameter of the bot, camera, appliance, etc. and be provided to the messaging application 103 upon the bot interacting with the messaging application 103.

In some implementations, message suggestions may be provided specifically to those users that have provided consent to access user data. In some implementations, message suggestions may be provided automatically or based on user input, e.g., a user may be provided a user interface to request suggestions.

In block 208, a conditioned language model is trained. For example, this block can be performed as a preprocessing step by the same or different system that performs other blocks of method 200, and can be performed a different point in time from the other blocks of method 200. The conditioned language model can be provided an image feature vector as an input as well as previous predicted words (e.g., word sequences), and can determine the probabilities of all words in a vocabulary to be the next word in the generated response. In some implementations, the conditioned language model includes a long-short term memory network (LSTM) to model chat-like responses (i.e., sequences of words) conditioned on an image feature that represents the image (as described below). The training data used to train the conditioned language model can include a number of image-response pairs that include an image and a response to that image in a messaging conversational context. In some implementations, responses to given images can be synthetically created for the training data (e.g., by humans) and/or the responses can be obtained from samples of actual responses from users to receiving particular images in messages in test or actual message conversation contexts, if consent from the users has been obtained. Some examples of training data are described in greater detail below.

In block 210, an image is obtained. In various implementations, the image may be a static image (e.g., a photograph, an emoji, or other image), a cinemagraph or animated image (e.g., an image that includes motion, a sticker that includes animation and audio, etc.), a video, etc.

In some implementations, an image can be obtained by being detected as having been received in a message conversation context, e.g., as included in an electronic message received from another user device over a communication network. In some implementations, the image may have been received as part of a request from an application program, e.g., via an application program interface (API), for one or more suggested responses.

In some further examples, the image may have been sent by one or more client devices 115, or by a bot that sends messages, and the image may be received by a client device 115 via network 140. In a one-on-one (1:1) messaging session with two participants, the image may be received by a client device of a particular user. In a group messaging session, the image may be received by two or more client devices of participants in the group messaging session. In some implementations, the image may be obtained from storage, e.g., local storage of a client device 115 (e.g., memory, storage drive, etc.) and/or remote storage accessible to a client device over network 140 (e.g., storage drives of a remote client device, server device, or storage device). In some implementations, the image can be posted within the messaging application, based on a message that includes the image being transmitted by a user. For example, the messaging server may post the image within the messaging application 103*a*. In another example, a client device 115 may post the image within the messaging application 103*b*. The method may continue to block 212.

In block 212, in some implementations, it is determined whether the image is eligible for generated suggestions. In this example method, it is assumed that the image is found to be eligible for generated suggestions. (If the image is not found eligible, e.g., the method is discontinued or obtains another image.) In some examples, the image is checked for particular types or classifications of content for which message suggestions are not to be provided. For example, the image and/or its metadata can be sent to content server 154, which can determine whether the image content is included in particular predefined classifications for which message suggestions are not to be provided. Content server 154 can use, for example, object detection techniques and/or detect other attributes of the image indicating unsuitability. The method continues to block 214.

In block 214, a feature vector is determined. The feature vector is a condensed numerical representation of the visual pixel content of the image obtained in block 210. For example, the feature vector can be a vector having a particular number of dimensions, with a value for each dimension. In some implementations, 128 dimensions can be used. In some implementations, the feature vector can be generated by a neural network based on the image pixel values (e.g., color values).

In some implementations, one or more feature vectors can be determined from particular portions of the image, e.g., "local" image features that are detected based on image detection or object recognition techniques (e.g., pattern matching, machine learning, etc.). For example, image features including faces (without identity), animals, objects, landscape features (foliage, buildings, sky, sunsets, etc.) can be detected. For example, if a main subject of an image is determined, a feature vector can be created from the portion of the image depicting that main subject. In some implementations, a feature vector of the main subject of an image can be considered representative of the entire image and used in method 200. The method continues to block 216.

In block 216, one or more suggested responses to the image are generated based on the feature vector that represents the image. In some implementations, the suggested responses are message suggestions to be sent as one or more conversational replies to a message (e.g., image) received in a message conversation (e.g., a conversation involving electronic messages sent between user devices), where the received message includes the image. In some examples, inference by one or more language models can be used, e.g., the conditioned language model that was trained in block

208, to determine the suggested responses. Furthermore, different techniques can be used to determine the suggested responses based on the outputs of the conditioned language model. Some example implementations that generate suggested responses are described below with reference to FIGS. 3-5, which use a beam search technique and a LSTM network. In some implementations, a sampling technique can be used to determine the suggested responses, e.g., the determined word having the highest probability to be the next word is added to the word sequence.

In some implementations, one or more suggested responses can be generated based on invoking or requesting information from one or more bots accessible to the device. The responses generated by the conditioned language model may be combined and ranked to identify one or more top suggested responses. The suggested responses can be text (e.g., phrases, words, etc.), images, videos, and/or other types of media content. In some example implementations, suggested responses can be generated in text form as described in some examples detailed below, and this generated text can be matched to concepts (e.g., labels) detected in other types of media content (such as images from a user's collection or from an accessible image library or photo library, if user consent has been obtained), where these concepts can be identified in the media content similarly as described herein. Such matched media content can then be provided as message suggestions as described herein. The method continues to block 218.

In block 218, one or more of the top-ranked suggested responses are provided to the user. For example, the top-ranked suggested responses can be displayed on a display device of a client device 115 used by the user. In some examples, if the image was obtained in a received message, the image can be displayed in a messaging interface and the top-ranked suggested responses can be displayed in association with the image, e.g., on one side of the image. In various implementations, a particular number of the top-ranked suggested responses can be displayed, e.g., three, ten, etc. In some implementations, the number of presented suggested responses can be determined by the user, e.g., via user input and/or stored user preferences. In some implementations, one or more of the top-ranked suggested responses are provided (e.g., transmitted) to a requesting device or application, e.g., an application on the same system performing method 200 or a different system, that requested one or more suggested responses. The method continues to block 220.

In block 220, in some implementations, a selection of one or more of the displayed top-ranked suggested responses is received. For example, the selection can be based on user input provided by the user at a user device, e.g., via an input device such as a touchscreen or trackpad receiving a user touch, a microphone receiving a voice command, a button, mouse, or joystick receiving user manipulation, etc. In some examples, the user can input a single tap on a touchscreen to select an associated suggested response, thus reducing the amount of user input compared to manually entering a response. In some implementations, one or more of the suggested responses can be selected automatically (without user input), e.g., based on user preferences, user context (e.g., geographic location, time or date, etc., if user consent has been obtained), or other predefined conditions.

In some implementations, block 220 can be implemented by a client device, e.g., receiving the selection via an input device connected to the client device. Some implementations can implement block 220 using a server device, e.g., that receives the selection that is transmitted to the server device over a communication network directly from an input device used by the user at a client device or other device, or via one or more other devices (e.g., client devices and/or server devices). The method continues to block 222.

In block 222, in some implementations, the suggested response(s) selected in block 220 are sent (or otherwise output). For example, the selected response(s) can be sent as one or more messages to one or more recipient devices. In some examples, a message can be transmitted over the network 140 to one or more other client devices 115 via messaging server 101 and/or directly to the other client devices 115. In some implementations, e.g., in a one-on-one conversation, the message is sent to the user device that sent the image obtained in block 210, e.g., in a message received by the user device, such as a chat message, text message, email message, etc. In some implementations, the message is sent to one or more user devices that are configured for a user account from which the image obtained in block 210 was sent. In some implementations, e.g., when the user selects more than one suggested response(s), the selected responses may be sent as separate messages, as a combined message, etc. In some implementations, a user interface may be provided that permits a selected suggested response to be edited, e.g., in a message composition interface, prior to outputting a message. The method can then return to block 210 in some implementations, e.g., if another image has been obtained.

Figure 3:
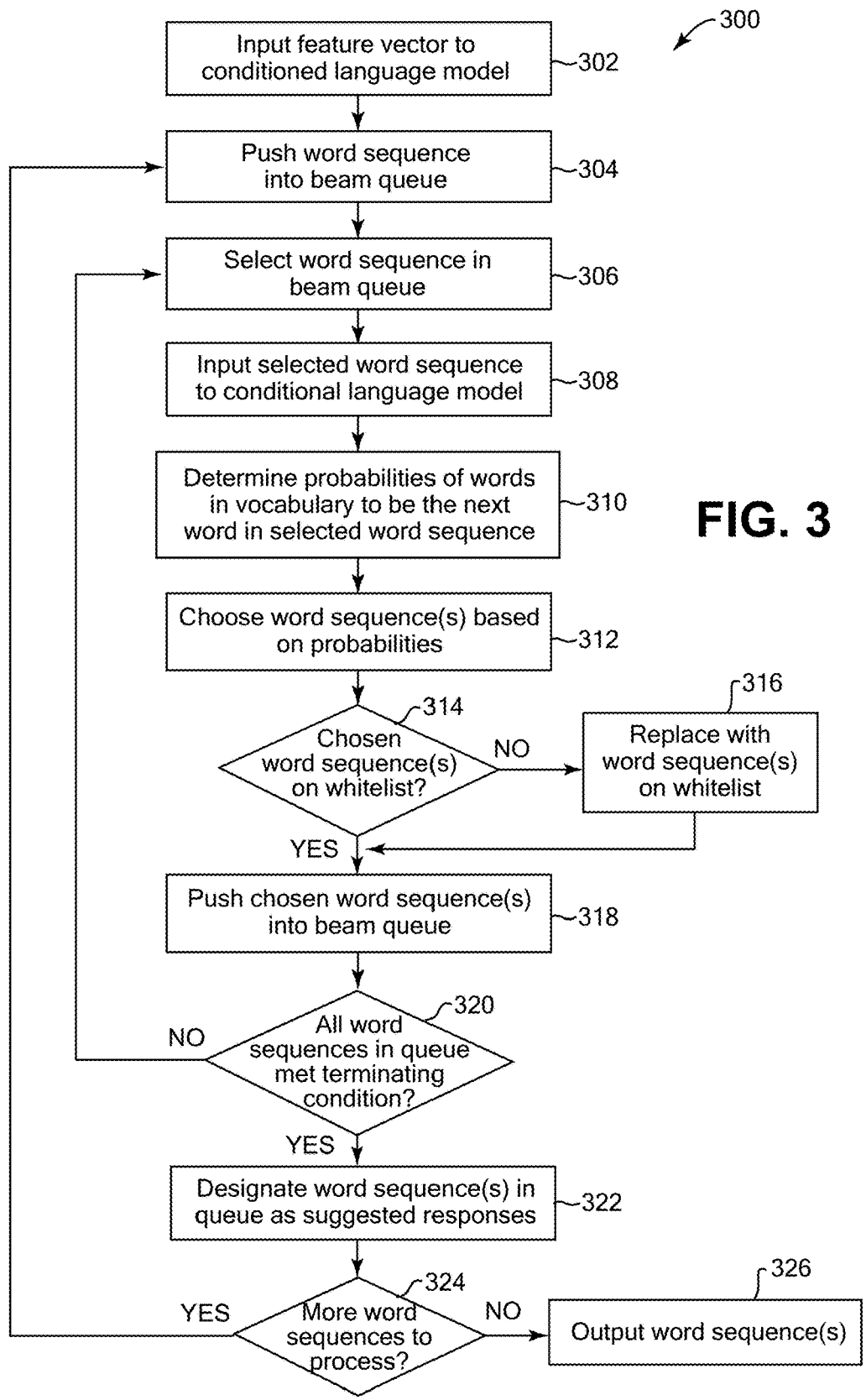
FIG. 3 is a flow diagram illustrating an example method to generate one or more suggested responses based on a feature vector representing an image, according to some implementations.

FIG. 3 is a flow diagram illustrating an example method 300 to generate one or more suggested responses based on a feature vector representing an image. For example, method 300 may be used to implement block 216 of the example method 200 of FIG. 2.

In a general summary and examples, the method 300 can include the following features in some implementations. First, a start token is pushed into a beam queue. Further, the feature vector for the image is fed to a conditioned language model. At an initial stage (block 304), the conditioned language model produces one or more words from a vocabulary as a first word that is determined based on the feature vector, e.g., words from previous responses used as training data, such as "pretty" "cute" and "neat." For each word in the initial stage, one or more word sequences are determined by adding a next word to create a sequence. For example, if the initial word is "pretty," sequences may be determined that each start with "pretty," e.g., "pretty woman," "pretty girl," "pretty cool," etc. Additional words may similarly continue to be added to a word sequence in later stages. Different word sequences may be of different lengths, e.g., "pretty good deal" may be a sequence of size 3. The process may be repeated for other words determined in the initial stage, e.g., "cute!", "cute poster," "neat trick," and so on (blocks 306-320). The top N sequences from the determined word sequences, based on the one or more first words, may be selected as suggested responses.

In block 302, a feature vector is input to a conditioned language model to condition the model. For example, the feature vector can be a condensed representation of an image obtained as described above for FIG. 2. The conditioned language model can include a trained neural network that has been trained using training data of images and common responses, e.g., as described above for block 208 of FIG. 2. The training data responses include words that form a vocabulary of available words which are used to form suggested responses. For example, a long-short term memory (LSTM) neural network can be used, where the image feature vector is input to a first instantiation of the LSTM. Some examples of an LSTM network which can be used are described below with respect to FIG. 5. The LSTM network (or other conditional language model) can be implemented in storage (e.g., memory) of a device and using one or more hardware processors. Some advantages of inputting a predetermined feature vector representing an image to the conditioned language model include that a feature extractor need not be deployed in the conditional language model, allowing a smaller size for the conditioned language model and potentially faster model execution.

In block 304, an initial word is pushed into a beam queue. In this example, a beam search technique is used to search for and compose responses based on the image and the outputs of the conditioned language model. Each response is a "word sequence," which can be one or more words provided in a sequence, e.g., a sequence of words as found in a response such as "so cute" and "I like it." A word can be a string of one or more characters, where the characters can be letters, punctuation marks (e.g., "!" or "?"), or in some implementations can be icons, emoji, symbols, or other characters.

The initial word that is pushed into the beam queue is used to initiate the word generation process for word sequences. In some implementations, the initial word is a special start token that indicates it is the start of the process. For example, the responses output from the conditioned language model can ignore the start token and any end token (described below). In some implementations, the beam queue has a maximum size Q, indicating that a maximum of Q word sequences (beams) are to be processed as described below. For example, Q can be 10, 20, or other number.

In block 306, a word sequence in the beam queue is selected. For example, in the first iteration of method 300, the selected word sequence is the first word, such as a start token as described above. In later iterations, the selected word sequence can be a next word sequence in the beam queue that has not yet been processed (e.g., not yet been processed to find the next word of that word sequence). In some implementations, the word sequences stored in the beam queue are word-image embeddings created by the LSTM neural network, where each embedding is vector of numbers that encodes, in a condensed form, the words that have so far been included in the word sequence as well as the image of the feature vector. For example, each word can be represented by a word embedding that can have the same number of dimensions as the feature vector, e.g., they are mapped to the same space and can be combined into the word-image embedding.

Figure 5:
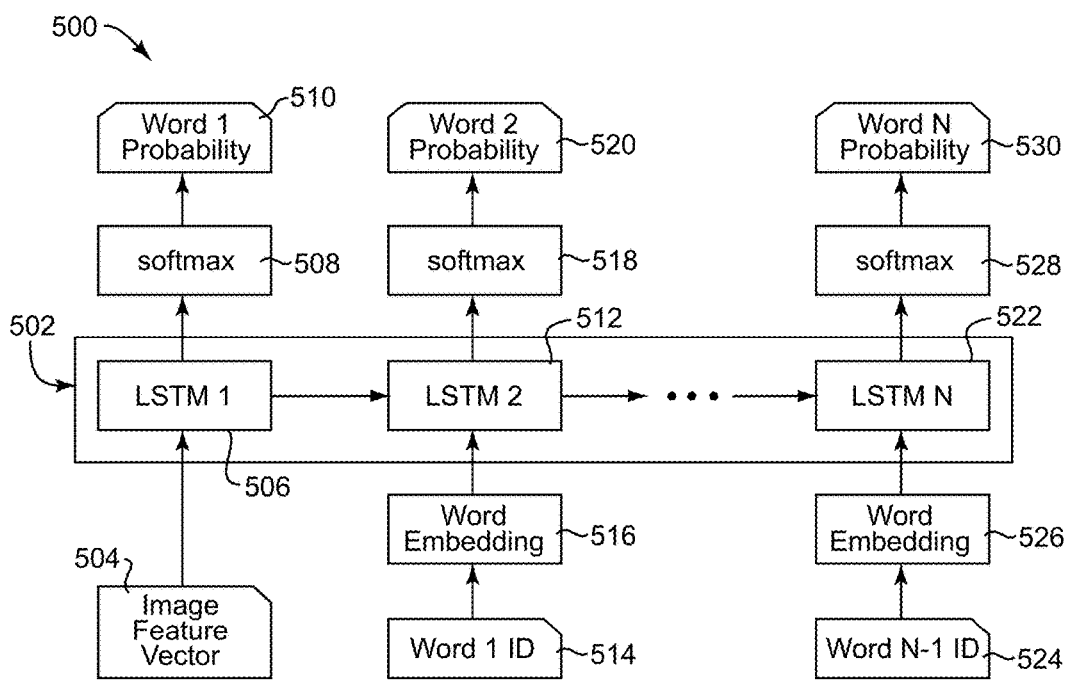
FIG. 5 is a block diagram illustrating an example of an architecture that can implement one or more features of a conditioned language model, according to some implementations.

In block 308, the selected word sequence is input to the conditioned language model. For example, the selected word sequence can be input to one LSTM (e.g., instantiation) of the LSTM network providing the conditioned language model. An example of an LSTM architecture is shown in FIG. 5. In some examples, in an initial iteration of block 308, the image feature vector input in block 302 is input to a first LSTM (e.g., instantiation) and the initial word (e.g., start token) is also input to the first LSTM. In later iterations of block 308, the selected word sequence is an embedding that encodes the image feature vector and the words that have so far been included in the selected word sequence, and is input to a later LSTM (e.g., instantiation) that provides the next word in the word sequence.

In block 310, using the conditioned language model, a plurality of words are determined or generated, from a vocabulary of words, to be a candidate next word in the word sequence, and probabilities are determined for the plurality of words to be the next word in the selected word sequence. For example, the LSTM to which the selected word sequence was input in block 308 determines the words and probabilities. The words and probabilities are determined by the conditioned language model based on the training of the conditioned language model using the training data including previous images and associated previous responses that provide the vocabulary of words. For example, the vocabulary of words includes the words used in the responses of the training data used to train the conditioned language model. In some implementations, the vocabulary of words can include a large number of words, e.g., thousands. In some implementations, the conditioned language model determines the probability of each word in the vocabulary of being the next word in the word sequence given the image feature vector, as based on the training from training data including responses to particular images, such that all words in the vocabulary have probabilities determined.

In some implementations, a subset of the set of vocabulary words can be determined for probabilities, e.g., all nouns, adverbs, or other types of words in the vocabulary, or a different selected subset of the vocabulary words. In some implementations, the subset of vocabulary words can be a subset of words having a known high probability (e.g., above a threshold probability or frequency) that they will be used in responses to received electronic messages, and/or used in responses to images received in such messages, e.g., based on general user data from prior sent messages and responses (if user consent from the senders/recipients of such messages has been obtained). As described above, the words can include text words, symbols (e.g., punctuation symbols, ellipses, etc.), emoji, etc. In some implementations, the words can include images (e.g., "stickers"), animations, etc. In some implementations, one of the possible next words for any word sequence from the vocabulary is a special end token, e.g., a token designated to indicate the end of the word sequence. In some implementations, a plurality of different word sequences are effectively created, based on respectively appending each used vocabulary word to the end of the selected word sequence.

In block 312, a number (e.g., Q) of word sequences, including the next words determined in block 310, are chosen based on the probabilities of the next words determined in block 310. Thus, the Q word sequences are chosen based on associated probabilities for their next words. The chosen Q word sequences are a subset of the word sequences formed from respectively appending the next words determined in block 310 to the selected (previous) word sequence. For example, the Q word sequences are chosen in which their next words have the highest probabilities as determined in block 310. For example, a probability is generated for each next word for each of the word sequences in the beam queue, and the Q word sequences associated with the highest probabilities are chosen. For example, each chosen word sequence is a word embedding including the image vector, the previous chosen words of this word sequence, and the next word that is now embedded to the end of this word sequence. In some cases, these can be word sequences in which the next word is an end token. In some implementations, the Q word sequences having probabilities above a predetermined probability threshold are chosen.

In some implementations, the choosing of Q word sequences can be influenced by other factors. For example, one factor can be one or more previous message responses sent by the user for whom the suggested responses are being generated. In some examples, if one or more of the generated word sequences is the same or similar (e.g., having a percentage threshold of the same words in the same sequence) as a previous response provided by the user in a messaging context, then higher weight can be assigned to those similar generated word sequences. For example, a higher weight may cause the weighted word sequence to be chosen over other word sequences associated with the same or similar probability as the weighted word sequence. The previous user responses can be obtained, for example, from message data storage such as the message application database 199, if user consent has been obtained. In some implementations, the previous image to which the previous response replied can also be compared to the current image, if such a previous image is available (e.g., in message data storage). If the current image is similar to the previous image (e.g., there is percentage similarity of values in their feature vectors), then it indicates that the previous response replied to a previous image that was similar to the current image. Consequently, the generated word sequences that are similar to the previous response corresponding to that previous image can be assigned a higher weight to increase their eligibility to be chosen in block 312.

In some implementations, previous images received by or sent by the user or user device can influence the choosing of the word sequences (e.g., block 312) and/or the generation of word sequences (e.g., block 310). In one example, suggested responses can be generated and/or weighted to refer to a previous image in the context of a current (more recently-received) image. For example, such suggested responses can be determined if the previous image was received within a predetermined time period before the current image was received. In some examples, if the previous image is determined to depict a first type of object (e.g., article of clothing such as a shirt), and the current image also depicts a same type of object (e.g., based on image object recognition techniques, image tags or other metadata, etc.), then the generated suggested responses can include "I liked the other one better" and/or "I like this one better."

In another example, suggested responses can be generated and/or weighted based on previous responses that were previously sent in response to a series or set of such previous images sent or received within a threshold period of time of each other. In some examples, such suggested responses can be generated and/or weighted higher if a set of images has been currently received that is similar or corresponding to the set of previous images (e.g., where the set of previous images were received within a threshold period of time from the current time). In some cases, one or more previous messages may be associated with the previous images (e.g., attached with the previous images or sent within a threshold time period of sending the previous images), and such previous messages can also be used in the response generation and/or weighting. In some examples, several previous images may have been received by the user within a threshold time period of the current time, which are related to each other in their subject matter. For example, the previous images may depict objects of the same type (e.g., particular types of articles of clothing) and which have different characteristics (e.g., colors, sizes, styles, etc.) that are depicted in the image (and detected using one or more object recognition techniques) and/or indicated in metadata of the images. In addition, a previous message such as "which one should I buy?" may have been received, which is associated with one or more of the previous images. Previous responses for such a set of previous images and/or previous message may have been "the second one," "I like the blue one" (if one of the depicted articles is blue), etc. Suggested responses can be generated for a current set of images based on training data including such previous messages and images. For example, suggested responses such as "the first one," "the second one," "third one," "the blue one," etc. can be generated and/or weighted more highly in generated suggested responses, as responses to a received set of images and/or a received message asking which object to purchase.

In block 314, in some implementations, it is determined whether all of the chosen word sequences are on a whitelist. For example, the whitelist can be a subset of the responses provided in the training data used to train the conditioned language model. The whitelist can be stored in accessible storage, e.g., memory or other storage of an accessible device of environment 100. In some implementations, the whitelist provides responses that are allowed to be output. Each chosen word sequence from block 312 can be compared to the responses on the whitelist. Word sequences that are not present on the whitelist are not allowed to be output as suggested responses. In some implementations, a blacklist can be used, e.g., providing responses that are not allowed to be output, such that chosen word sequences matching responses on the blacklist are not allowed to be output.

If all of the chosen word sequences are found on the whitelist in block 314, the method continues to block 318, described below. If one or more of the chosen word sequences are not found on the whitelist in block 314, then the method continues to block 316, in which the word sequences that were not present on the whitelist are replaced with other word sequences including different next words as determined by the conditioned language model in block 310. For example, the word sequences having a next word with the next highest probabilities after the N highest probabilities can be chosen to replace the word sequences not on the whitelist. The method continues to block 318.

In block 318, the chosen word sequences are pushed into the beam queue. For example, word sequences that are derived from earlier versions of word sequences in the beam queue (e.g., where the earlier versions have fewer words) can be stored in place of the earlier versions in the beam queue (e.g., in place of earlier versions that do not have an end token, in some implementations).

In block 320, it is checked whether all the word sequences in the beam queue have met one or more terminating conditions. For example, one terminating condition can be that all word sequences in the beam queue have ended with the special end token as their last word, indicating that there will be no more words added to those word sequences. The conditioned language model can generate the end token for a word sequence as one of the generated next words of a sequence. Another terminating condition can be that a maximum length of words in the word sequences has been reached for the word sequences in the beam queue. A combination of terminating conditions can be also be checked, e.g., all word sequences in the beam queue end with the special end token or have the maximum word length.

If not all word sequences in the beam queue have met one or more terminating conditions, the method returns to block 306 to select a word sequence in the beam queue. In some implementations, the selected word sequence can be a word sequence that has not ended in the special end token, has not attained the maximum word length, or has not achieved some other terminating condition. In some implementations, the selected word sequence can be one of the word sequences that were just generated (e.g., had a word added) and stored in the beam queue in the last iteration.

If, in block 320, all the word sequences in the beam queue have met one or more terminating conditions, the method continues to block 322, in which the word sequences in the beam queue are designated as suggested responses. For example, these word sequences and scores of these word sequences (described below) can be flagged and/or stored as suggested responses. The method then continues to block 324.

In block 324, it is checked whether there are one or more additional word sequences to process. For example, there may be one or more word sequences chosen in block 312 (and qualifying in block 314) from a previous iteration which did not yet meet a terminating condition because other chosen word sequences were pushed into the beam queue to process. If there are more word sequences to process, the method continues to block 304 to push an unprocessed word sequence into an (empty) beam queue, and repeat the processing of blocks 306-320.

If there are no more word sequences to process as checked in block 324, the method continues to block 326, in which the designated word sequences are output as generated suggested responses. For example, the output suggested responses can be provided to block 218 of FIG. 2. In some implementations, as described above for block 322, the beam search produces a score for each word sequence, and the word sequences are ranked based on this score. For example, the score of a word sequence can be based on the probabilities of one or more of the words included in that word sequence as determined by the conditioned language model. In various implementations, the score of a word sequence can be the probability of the last word added to the word sequence, or a combination (e.g., average) of the probabilities of the words in the word sequence, and/or can be based on other factors (e.g., word sequences with fewer words can be assigned a better (e.g., higher) score than word sequences with more words, word sequences with particular words (e.g., from a predetermined list) can be assigned a higher score than words not on the list, etc.).

In some implementations, the word sequences can be output in block 320 in a ranked order based on their scores, e.g., such that block 218 can select a particular number of top-ranked suggested responses.

In other implementations, other methods or variations of the blocks of FIG. 3 can be used to determine suggested responses using the conditioned language model. For example, some implementations can use different sizes of beam queue, different order of performance of one or more of the blocks, different techniques for generating and retaining different word sequences provided from the conditioned language model, etc.

Figure 4:
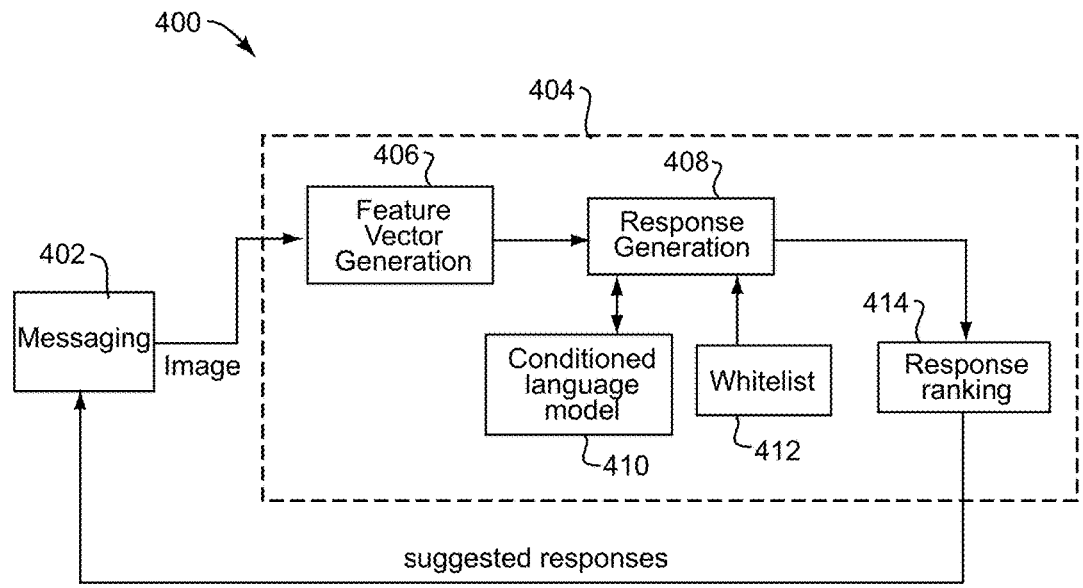
FIG. 4 is a block diagram illustrating an example module that can implement one or more described suggested response features, according to some implementations.

FIG. 4 is a block diagram illustrating one example module 400 that can implement one or more suggested response features described herein. In some implementations, a messaging module 402 can be a component of a messaging application 103, and may obtain an image as described above for FIG. 2, e.g., as part of a received message from a different user device. The image can be sent to a message suggestion module 404, which can include several different components. Some or all of the components of the message suggestion module 404 can be implemented in messaging application 103, response generator 150, and/or in other modules or components of the system shown in environment 100.

For example, the image (e.g., image pixels) can be sent from messaging module 402 to the feature vector generator 406 which is described above with reference to FIG. 2. As described above, the feature vector generator 406 determines a feature vector based on the image pixels, where the feature vector represents the image. The feature vector generator outputs a feature vector of a number of dimensions, which is output to a response generator 408.

In some implementations, the response generation module 408 determines one or more suggested responses for the image feature vector by using a conditioned language model 410. The response generation module 408 (and/or conditioned language model 410) can use a whitelist 412 in some implementations to potentially filter out some suggested responses, e.g., that do not appear on the whitelist.

In some implementations, one or more suggested responses can be generated based on invoking or requesting information from one or more bots accessible to the device. For example, if the response generation component 408 (or other component of the system) determines that an appropriate suggested response would be particular information relevant to the content of the image, a bot that can obtain that information can be determined and a command and/or request to the bot can be generated as a suggested response.

In some implementations, a message ranking component 414 can receive the suggested responses generated by the response generation module 408 and combines and ranks the suggested responses into a ranked order. For example, the suggested responses can be ranked based on calculated scores, where a score can be determined for each suggested response determined for the image. In some implementations, a score can be determined for each suggested response. In some implementations, the scores are based on the probabilities determined by the conditioned language model as described above. In some implementations, the scores can be based on a determined probability that the suggested response is relevant to the image, where the probability can be based on, e.g., frequency of occurrence of the response in historical message data (and/or in training data as described above). Historical message data may be data from prior conversations where participants in the conversation have provided consent for use of such data to implement suggested response features. Historical message data is not used if users have not provided permission for such use. In some implementations, the response generation module 408 can provide scores for the responses, which can be used to rank the responses by the message ranking component 414. In some implementations, the response generation module 408 can provide scores and rankings of generated suggested responses, as described above for FIG. 3, e.g., the message ranking component 414 can be included in the response generation module 408.

Suggested responses can be output in the ranked order. In some implementations, suggested responses that request information from bots can be similarly ranked based on one or more confidence scores determined based on similar factors (frequency in training message data, etc.), and/or in some implementations at least one bot-related response can always be ranked highly (e.g., a response that invokes the bot can be presented as an alternative suggested response for the user). In some implementations, the system can also rank suggested responses based on diversity. For example, if multiple highest ranking suggested responses are similar to each other in words, letters, or semantic meaning (e.g., as determined by referred-to dictionaries, thesaurus, or other technique and/or data), then the ranking can be adjusted to increase diversity of suggested responses, e.g., by lowering the rank of at least one of the similar responses.

In some implementations, a particular number of the top-ranked suggested responses can be sent to be displayed or otherwise output on a user device. One or more of these suggested responses can be selected by user input to send one or more messages to other devices, where the one or more messages include the content of the selected suggested responses. In some implementations, if a selected suggested response is a command or request to a bot, the bot can be added to a message conversation and obtains and displays requested information in the conversation interface, and the users can send further messages to the bot.

FIG. 5 is a block diagram illustrating one example of a LSTM architecture 500 that can implement one or more features described herein. The LSTM architecture 500 implements the conditional language model and includes multiple LSTMs 502 that represent instantiations or copies of an LSTM model block at different stages of the implemented process.

In this example, training is first provided for the system. In some implementations, training data can include image-response pairs as described above, which may have been filtered (e.g., filtered via pointwise mutual information (PMI) filtering) and/or otherwise processed. The LSTM model is trained to output probabilities of the next word in a word sequence after being input an embedding including the image feature vector and all previous words in the word sequence. For the training, image feature vectors representing images of the training data are input to a first LSTM 506. In addition, for the training (and not for inference), word embeddings are input to the LSTMs after the LSTM 506, where the word embeddings represent individual words that were included in responses of the training data that correspond to the images. In some examples, the words of a training data response are input to the LSTMs at one time. In some examples, a word ID (e.g., word ID 514 or 524) can be a one-hot vector representing a particular word and having a dimension size of the vocabulary, which is fed into a neural network to produce a word embedding (e.g., word embedding 516 or 526) which is a lower dimensionality vector, e.g., having the dimensionality of the image feature vector.

In an example training process, the first LSTM 506 outputs a vector of values (the output of the LSTM neural network, e.g., the top layer of the LSTM) encoding information indicating a distribution of words for a Word 1, where the vector is input to a softmax function 508. The softmax function 508 outputs a Word 1 probability distribution 510 that indicates the probabilities of the words of the vocabulary to be the next word (Word 1) in the word sequence. The vocabulary words are from the responses used in the training data used to train the conditioned learning model. The first LSTM 506 also outputs an embedding that is input to the second LSTM 512, where the embedding includes a representation of the image feature vector 504 and previous words of the sequence. In the example of FIG. 5, a sample Word 1 ID 514 is provided as a word embedding 516 that is input to the second LSTM 512, e.g., representing a first word included in a response to the image represented by image feature vector 504. The LSTM 512 outputs a vector of values encoding information indicating a distribution of words for a next word (Word 2) that is input to a softmax function 518, and the softmax function 518 outputs a Word 2 probability distribution 520 that indicates the probabilities of the words of the vocabulary to be the next word (Word 2) in the word sequence. The LSTM 512 also outputs an embedding representing the image feature vector and the previous words of the sequence, where the embedding is input to the Nth LSTM 522. An N−1th word ID 524 is provided as a word embedding 526 to the Nth LSTM 522. LSTM 522 outputs a vector for a determined next word (Word N) that is input to a softmax function 528, and the softmax function 528 outputs a Word N probability distribution 530 that indicates the probabilities of the words of the vocabulary to be the next word (Word N) in the word sequence.

In the example training process, determined probabilities are fed back to the LSTMs and weights are adjusted such that the LSTMs produce high probabilities for word sequences that have been used in responses, e.g., based on the input Word 1 to Word N−1 embeddings 516 and 526 that are known to have been included in the responses of the training data that correspond to the image (represented by the image feature vector) of the training data.

During runtime (e.g., inference processing to determine word probabilities based on an input image, an example of which is described for FIG. 3), the conditioned language model has been previously trained. A new image represented by an image feature vector 504 is input to the LSTM 506. The LSTM 506 determines a distribution over the words of the vocabulary for the next word, Word 1, based on the image feature vector, and outputs a vector of values for the distribution that is input to softmax function 508. The softmax function 508 determines and outputs a probability distribution 510 that indicates the probabilities of the words of the vocabulary that can be used for Word 1 as the next word in the word sequence. A search method can select one or more of these words based on these probabilities, e.g., using the beam search technique described above with reference to FIG. 3.

In a following iteration, the search method (e.g., block 308 of FIG. 3) provides an embedding representing the feature vector and the previous word chosen for the word sequence to the second LSTM 512. The LSTM 512 determines a distribution of words from the vocabulary for the next word of the word sequence, Word 2, based on the embedding, and outputs a vector of values for the distribution that is input to softmax function 518. The softmax function 518 determines and outputs a probability distribution 520 that that indicates the probabilities of the words of the vocabulary that can be used for Word 2 as the next word in the word sequence. The search method selects one or more of these words based on these probabilities. In a following iteration, the search method can input an embedding representing the feature vector and the previous words chosen for the word sequence to the next LSTM 522 to determine a word distribution for the Nth word of the word sequence, and the LSTM 522 similarly produces a probability distribution 530 for Word N. The search method selects one or more of these words based on these probabilities.

Thus, the LSTM network of FIG. 5 determines the probability of each next word in a word sequence. In effect, the LSTM network determines probabilities associated with each word sequence, since the previous words, determined based on their probabilities, are included in the word sequence embedding that an LSTM instantiation provides to the next LSTM instantiation. The suggested responses determined from the word sequences thus are also associated with the probabilities.

The conditioned language model can be trained based on training data as described above. The conditioned language model can be created, based on the training data, prior to receiving the image for which suggested responses are to be generated, so that upon receiving the image, the suggested messages can be generated using the existing model.

In some implementations, part or all of the conditioned language model can be updated based upon images received during runtime and based upon suggested responses that were ultimately selected by the user (or application) for sending in a message or selected for other use. For example, the received image and a user-selected response can be provided as a new image-response pair using in updating training of the model.

In some examples, the training data may be message data that includes images and responses to those images. For example, the message data can be synthetic data, e.g., based on simulated conversations where no human users are participants. In some implementations, training data may include images and messages actually exchanged by users who consent to provide such data for training purposes. Training data is treated before use to remove user identifiers and other user-related information. For example, in some implementations, image-response pairs can be obtained as training message data, which identify a particular image that was received and the content of the response that was selected by a user and transmitted in reply to receiving the particular image. For example, the responses may have been selected in a messaging application during a conversation.

In some implementations, to determine at least a portion of the training message data from a set of message data, the system can determine frequent historical responses from users in the set of message data in reply to receiving images in messages, and the most frequent responses and images can be organized and stored by the system as training data.

In some implementations, many of the most frequent responses in the set of message data may not be as suitable to determine suggested responses as other, less frequent responses. For example, the most frequent responses may be dominated by responses that may not be specific to particular images (e.g., particular types of image content). In some examples, a generic response such as "lol" may be the most frequent response to many different images and/or many different types of image content (e.g., image features), and is not specific to any particular image content or types of image content. Some implementations can filter out such frequent generic responses to obtain more content-specific responses for an image for training data. For example, statistical association scores can be computed between images and responses. In some examples, pointwise mutual information (PMI) can be determined for each image-response pair as below:

$$PMI(\text{image, response}) = \log \frac{P(\text{image, response})}{P(\text{image})P(\text{response})}$$

Pairs having an association score (e.g., PMI) below a particular association threshold (e.g., PMI threshold) can be removed from the training data. In some examples, an association threshold of 1 can be used. The pairs remaining after the filtering are more frequently occurring than the filtered pairs when the image and response independently occur in the set of message data, and thus the responses of these remaining pairs are more specific to the image content in these remaining pairs (e.g., the pairs remaining have images and responses more associated with each other, while the pairs filtered out have images and responses less associated with each other). The remaining pairs can be used as the training data to train a conditioned language model to generate suggested responses for new images that are detected to be similar to images included in the remaining pairs. Thus, the training data can be filtered such that the previous responses in the training data are more specific to particular content of the previous images than other, more generic, previous responses that are filtered out of the training data.

In some implementations, if user consent has been obtained, a user's preference for one or more responses (e.g., as indicated in previous response data) can be used to weight same or similar responses in the training data for the training of the model. The user preference can be indicated, for example, for responses that have been frequently provided by the user (e.g., provided by the user more than a threshold number of times) and/or have been received and rated favorably by the user (e.g., with an explicit user rating or positive return reply). For example, the same or similar responses can have a greater bias in the training of the model, e.g., causing these responses to have greater probabilities or scores when the model generates probabilities as described above. Similar responses can include responses that have the same word roots (e.g., words without suffixes or punctuation), and/or have the same semantic meaning as determined by referenced databases (e.g., thesaurus, dictionaries, etc.), knowledge graphs, or models.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

Figure 6:
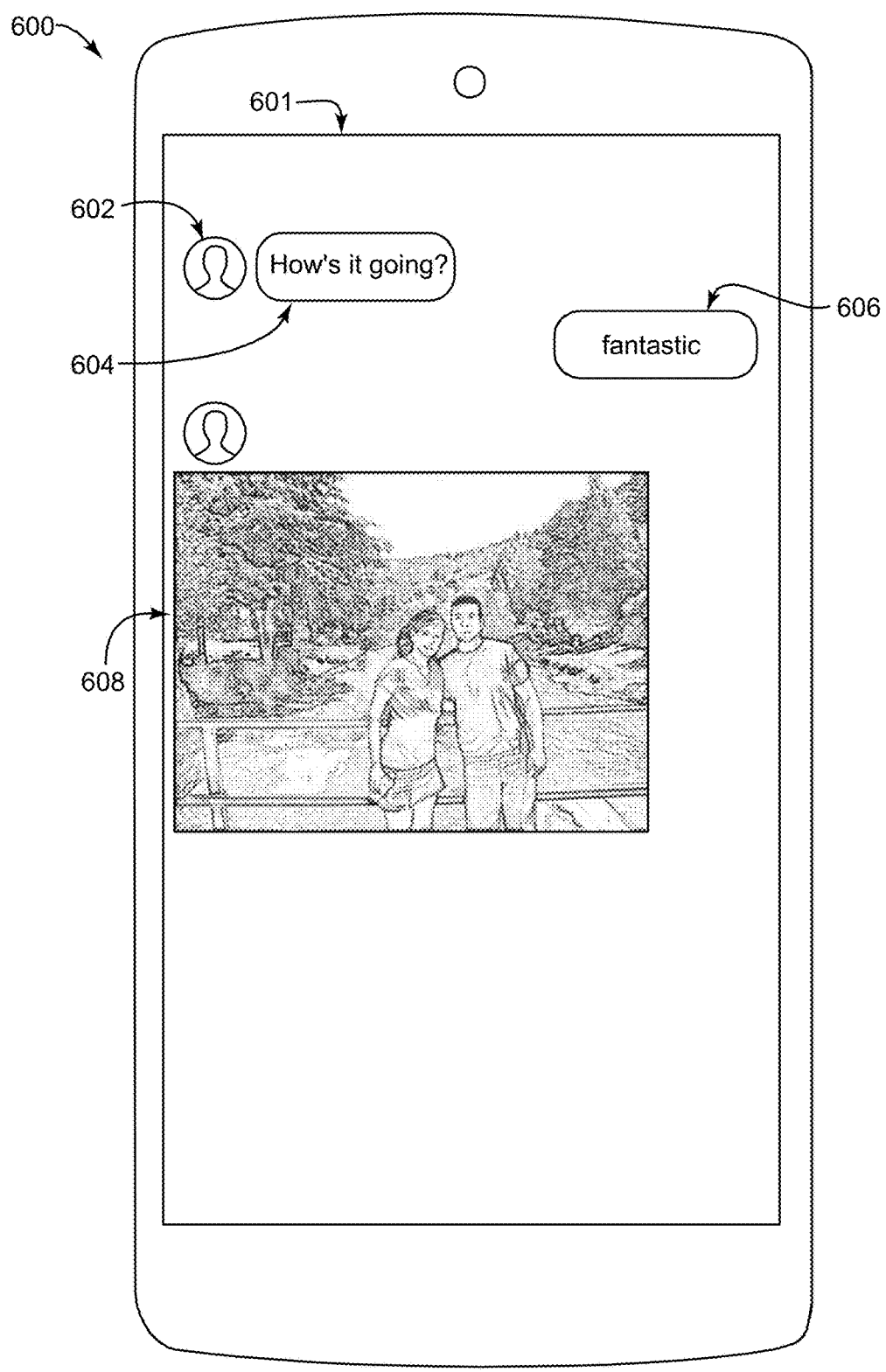
FIGS. 6-11 are graphic illustrations illustrating examples of determined suggested responses to images, according to some implementations.

FIG. 6 is a graphic representation of an example client device 600 displaying a user interface 601 in which a messaging application is used for a conversation between users. In this example, a first user and a second user are participating in a chat via their client devices, where the second user is operating the client device 600. The first user, represented by displayed icon 602, sends a message 604 to the second user as displayed in the user interface. For example, the message 602 may have been transmitted over a network from a user device of the first user to the client device 600 operated by the second user. The second user responds with a message 606 which is displayed in the user interface. For example, the second user may have input the message 606 in the user interface 601, e.g. via a displayed keyboard or other input display or device. In response, the first user sends a message including image 608 to the second user, where the image 608 is displayed in the user interface after (e.g., below) the previous messages of the conversation. In some examples, the first user 602 is a human user. In some implementations, the first user 602 may be a bot.

In some implementations, the first user sends messages to the second user by messaging a phone number (e.g., when the messaging application 103 works over SMS, or another messaging application that utilizes phone numbers) or selecting the user from a contacts list (e.g., when the messaging application 103 works over rich communications services (RCS) or another chat interface).

Figure 7:
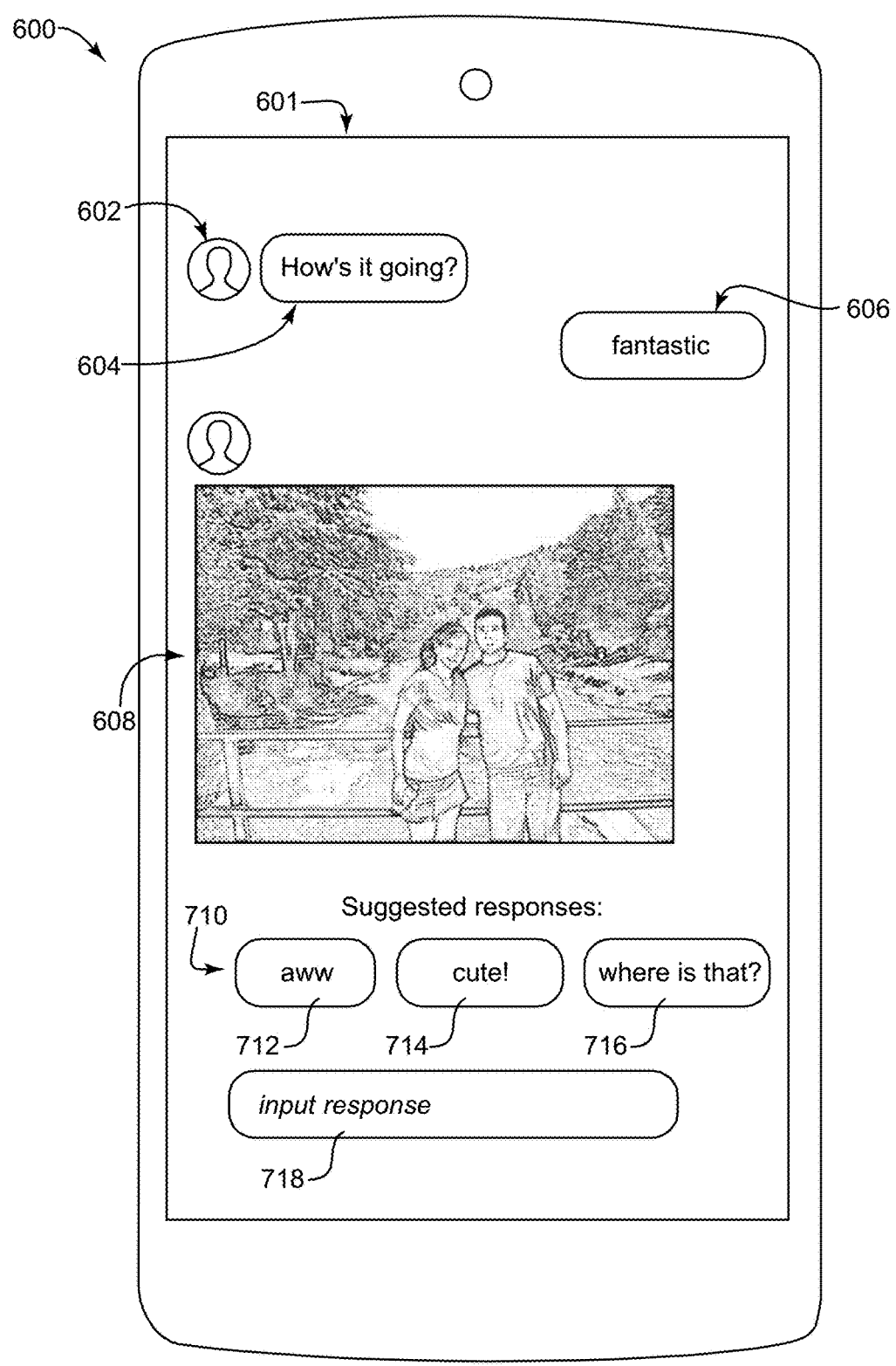

FIG. 7 is a graphic representation of the example client device 600 and user interface 601 of FIG. 6 with a conversation in a messaging application that includes generated suggested responses to the received image. The conversation illustrated in FIG. 7 is the same as that in FIG. 6. As seen in FIG. 7, the messaging application 103 provides one or more suggested responses 710 to the image 608, e.g., by using the method illustrated in FIG. 2, which are displayed in the user interface 601. A message field 718 can alternatively be used by the second user to input a text message to send to the first user (e.g. via keyboard, voice commands, etc.). Any of the suggested responses 710 may be selected by the second user as a response to receiving the image 608. For example, suggested response 712 (having the text "aww"), suggested response 714 (having the text "cute couple?"), and suggested response 806 (having the text "where is that?") are displayed in the user interface 601 as options for the second user to select to respond to the message including image 608. For example, the suggested responses 712, 714, and 716 are displayed under the received image 608 in FIG. 7, but can be displayed in any of a variety of locations in the user interface (e.g., above, to the side, or surrounding the image 608, in a separate displayed field or window in user interface 601, etc.).

In the example shown in FIG. 7, the image 608 has been processed by the conditioned language model to determine suggested responses based on the model's training as described herein. One or more of the suggested responses 710 may be determined based on the conditioned language model that has been trained by training data including previous responses provided by users to images depicting similar pixels to image 608. Since the responses are determined directly based on a representation of image pixels, suggested responses can be determined and presented which are appropriate and relevant to the image and which are not limited to determined labels that are based on concepts or depicted image features detected by the system in the image 608. In this example, the suggested response 712, "aww," is determined based on the image pixels and machine learning training based on previous message data. The suggested response 712 may not have been able to be determined by other techniques in which labels are determined and suggested responses are determined from the labels, e.g., based on data relating labels to suggested responses. For example, such labels may include "persons," "man," and "woman" to describe image features detected in the image 608 by the system, and such labels may not be likely to produce a suggested response such as response 712 and/or other responses 714 or 716.

FIGS. 8, 9, 10, and 11 are graphic representations illustrating additional examples of determined suggested responses to images, e.g., received in a message from a different user device. In these examples, the suggested responses are displayed in user interfaces of a messaging application and can be generated by or for the messaging application using one or more features described herein.

Figure 8:
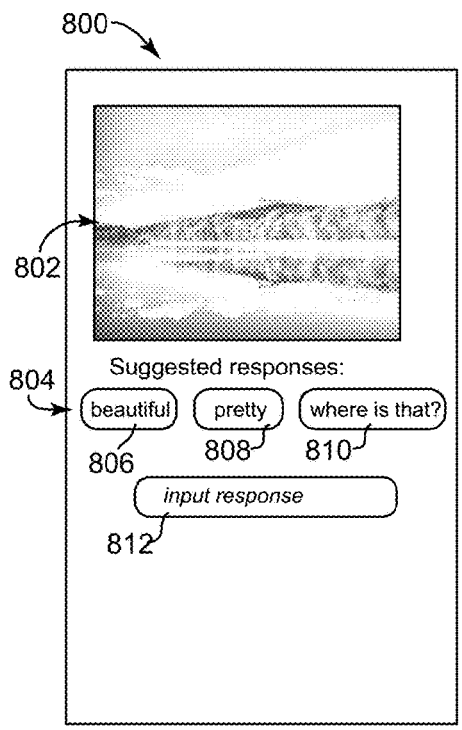

FIG. 8 illustrates a user interface 800 that displays a received image 802 and suggested responses 804 determined using the conditioned language model based on the image 802 and presented in the user interface 800 for selection by the second user in reply to the image 802. In this example, the suggested responses include suggested response 806 ("beautiful"), suggested response 808 ("pretty"), and suggested response 810 ("where is that?"). One or more of the responses 806, 808, and 810 can be selected to send the selected response(s) to the first user over a communication network (e.g., a confirmation prompt can be displayed to request that the second user confirm that a selected suggested response is to be sent). A message field 812 can alternatively be used by the second user to input a text message to send to the first user. The responses 806, 808, and 810 can be appropriate responses determined directly based on the image pixels. For example, response 806 may not have been determined by other techniques in which suggested responses are determined based on labels such as "lake," "sky" and "trees" were determined based on detected image features and concepts depicted in the image.

Figure 9:
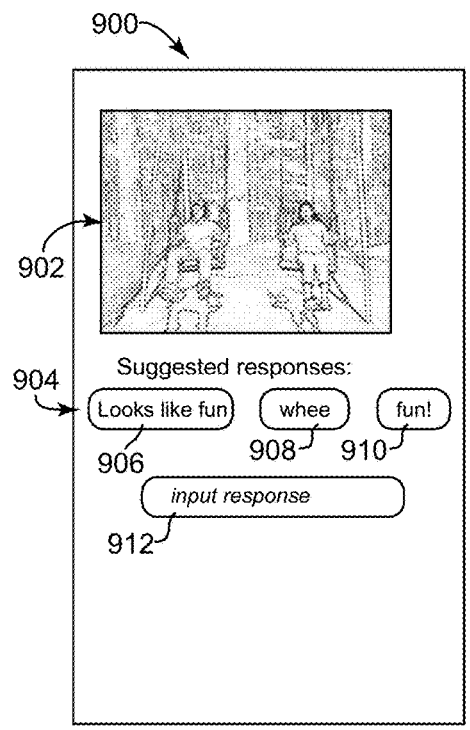

FIG. 9 similarly illustrates a user interface 900 that displays a received image 902 and suggested responses 904 determined using the conditioned language model based on the image 902 and presented in the user interface 900 for selection by the second user in reply to the image 902. In this example, the suggested responses include suggested response 906 ("looks like fun"), suggested response 908 ("whee"), and suggested response 910 ("fun!"). One or more of the responses 906, 908, and 910 can be selected by the second user to send the selected response(s) to the first user over a communication network. A message field 912 can alternatively be used by the second user to input a text message to send to the first user. The responses 906, 908, and 910 can be appropriate responses determined directly based on the image pixels. For example, response 906 may not have been determined by other techniques in which suggested responses are determined based on labels such as "persons," "man," "woman," and "trees" determined for the image based on detected image features and concepts depicted in the image.

Figure 10:
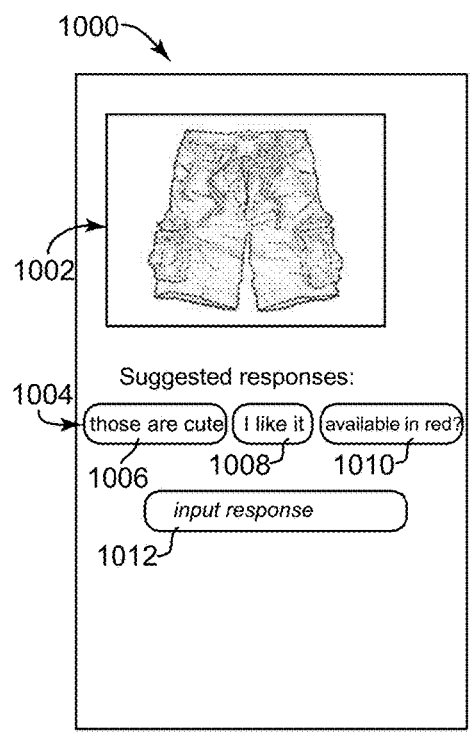

FIG. 10 similarly illustrates a user interface 1000 that displays a received image 1002 and suggested responses 1004 determined using the conditioned language model based on the image 1002 and presented in the user interface 1000 for selection by the second user in reply to the image 1002. In this example, the suggested responses include suggested response 1006 ("those are cute"), suggested response 1008 ("I like it"), and suggested response 1010 ("available in red?"). One or more of the responses 1006, 1008, and 1010 can be selected by the second user to send the selected response(s) to the first user over a communication network. A message field 1012 can alternatively be used by the second user to input a text message to send to the first user. The responses 1006, 1008, and 1010 can be appropriate responses determined directly based on the image pixels. For example, response 1006 may not have been determined by other techniques in which suggested responses are determined based on labels such as "clothing" and "pants" determined for the image based on detected image features and concepts depicted in the image.

Figure 11:
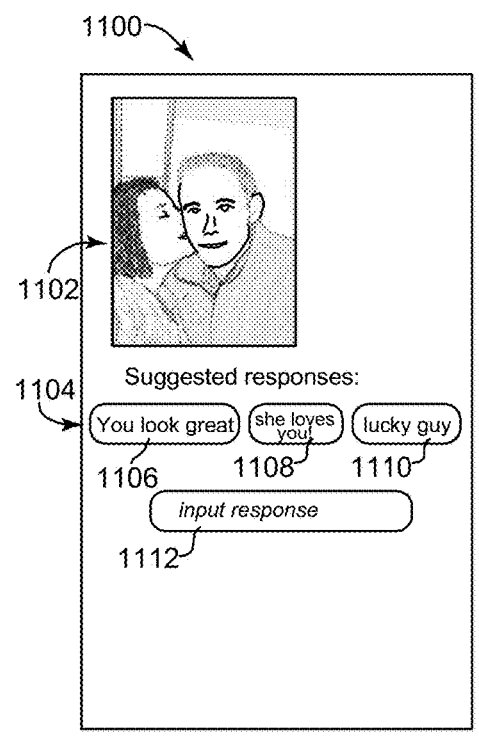

FIG. 11 similarly illustrates a user interface 1100 that displays a received image 1102 and suggested responses 1104 determined using the conditioned language model based on the image 1102 and presented in the user interface 1100 for selection by the second user in reply to the image 1102. In this example, the suggested responses include suggested response 1106 ("You look great"), suggested response 1008 ("she loves you!"), and suggested response 1010 ("lucky guy"). One or more of the responses 1106, 1108, and 1110 can be selected by the second user to send the selected response(s) to the first user over a communication network. A message field 1112 can alternatively be used by the second user to input a text message to send to the first user. The responses 1106, 1108, and 1110 can be appropriate responses determined directly based on the image pixels. For example, response 1106 may not have been determined by other techniques in which suggested responses are determined based on labels such as "persons," "woman," "man," and "kiss" determined for the image based on detected image features and concepts depicted in the image.

Bot Implementations

A bot is an automated service, implemented on one or more computers, that users interact with primarily through text, e.g., via messaging application 103a/103b. A bot may be implemented by a bot provider such that the bot can interact with users of various messaging applications. In some implementations, a provider of messaging application 103a/103b may also provide one or more bots. In some implementations, bots provided by the provider of messaging application 103a/103b may be configured such that the bots can be included in other messaging applications, e.g., provided by other providers. A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning, compared with that required to use a website, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125a-n) via messaging application 103a/103b to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103a/103b may provide many advantages. Conventionally, a user may utilize a software application or a website to perform activities such as paying bills, ordering food, booking tickets, etc. A problem with such implementations is that a user is required to install or use multiple software applications, and websites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a web site that is hosted on one or more web servers, a customer support email hosted on an email server, etc. Another technical effect of described features is a reduction in the problem of consumption of system processing and transmission resources required for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107a/107b, 109a/109b, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103a/103b in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a messaging conversation without being specifically invoked. That is, the users may not need to specifically invoke the bot. In these embodiments, the bot may depend on analysis and understanding of the conversation on a continual basis or at discrete points of time. The analysis of the conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, the conversation may be analyzed on a continual basis or at discrete points of time, and the analysis of the conversation may be used to understand specific user needs and to identify when a bot should be suggested within the conversation.

In the embodiments in which a bot may automatically suggest information or actions within a messaging conversation without being specifically invoked, such functionality is disabled, e.g., if one or more users participating in the messaging conversation do not provide consent to a bot performing analysis of the user's conversation. Further, such functionality may also be disabled temporarily based on user input. For example, when the users indicate that a conversation is private, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, as shown in FIG. 1, bot 105 is implemented on client device 115a. In this example, the bot may be a module in a software application that is local to client device 115a. For example, if a user has installed a taxi hailing application on client device 115a, bot functionality may be incorporated as a module in the taxi hailing application. In this example, a user may invoke a taxi bot, e.g., by sending a message "@taxibot get me a cab." Messaging application 103b may automatically cause the bot module in the taxi hailing application be launched. In this manner, a bot may be implemented locally on a client device such that the user can engage in conversation with the bot via messaging application 103.

In another example shown in FIG. 1, bot 107a is shown implemented on client device 115a and bot 107b is shown as implemented on messaging server 101. In this example, the bot may be implemented, e.g., as a client-server computer program, with portions of the bot functionality provided by each of bot 107a (server module) and bot 107b (client module). For example, if the bot is a scheduling bot with the handle @calendar, user 115a may schedule a reminder, by typing "@calendar remind me to pick up laundry in the evening," which may be handled by bot 107b (client module). Continuing with this example, if user 115a tells the bot "check if Jim is free to meet at 4," bot 107a (server module) may contact user Jim (or Jim's scheduling bot) to exchange messages, and provide a response to user 115a.

In another example, bot 109a (server module) is implemented on server 135 and bot 109b (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103a/103b, messaging application 103a/103b may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103a/103b are not implemented (e.g., disabled, removed, etc.). If the user provides consent, a bot or messaging application 103a/103b may make limited use of messages exchanged between users via messaging application 103a/103b to provide specific functionality, e.g., translation, scheduling, etc.

In some implementations, third parties distinct from a provider of messaging application 103a/103b and users 125, may provide bots that can communicate with users 125 via messaging application 103a/103b for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103a/103b may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103a/103b and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1234?" etc.

In some implementations, one or more suggested responses generated by systems described above (e.g., systems described for FIGS. 2-11) can be messages used to invoke or command a bot, e.g., request a bot for information. For example, the system can determine whether a received image includes content that would be assisted by information and/or one or more functions provided by a bot. In some examples, the first user in a conversation may send a text message to the second user, saying, "Guess where?" The first user then sends an image to the second user's device. The system can determine that a phrase including the word "guess" indicates that a suggested response can be a request to find out the information related to the image content. (Other words can also indicate such a request, such as "where," "what," etc.) In response, the system can generate a suggested response that is a request or command to an appropriate bot that can provide the relevant information. For example, a suggested response can be a request to a mapping bot to provide the name of the location depicted in the image (e.g., where the bot can determine such information using web searches, maps and atlases, geographic location metadata of the received image, etc.). In some implementations, the training message data can be used (if user consent has been obtained) to determine appropriate types of bots for particular types of image content that has been detected in the image (e.g., using one or more image detection or recognition techniques, if user consent has been obtained), and/or rules-based grammars can determine which types of bots to invoke in a suggested response based on the types of image content and/or concepts detected in the image content.

In some implementations, if the bot-related suggested response is displayed for the user as a possible response and the user selects that suggestion, the bot can be added to the message conversation and messaging interface, e.g., represented with a bot name. The bot can determine and output the requested information in the conversation, e.g., as messages to both the first and second users in a messaging user interface.

In another example, the first user sends an image depicting text that is in a language foreign to the second user. The system can determine that an appropriate suggested response is a request to a language bot to translate the text in the image and to output the translated text in the message conversation interface.

In another example, the first user sends an image depicting a food item. The system can determine that an appropriate suggested response is a request to a bot to check one or more accessible data sources (e.g., on the Internet) to determine the ingredients and/or calories typically or specifically included in the food item, and to output that information in the message conversation interface.

Implementations described herein generally relate to messaging applications. Certain implementations may automatically (e.g., without user intervention) analyze image content of one or more messaging conversations and/or user information to automatically provide suggested responses to a user within a messaging application. In certain examples, the automatic suggested responses may be selected by a user to respond in the messaging application, and/or may be automatically sent as one or more appropriate responses on behalf of a user. In certain other examples, the suggestions may automatically incorporate particular non-messaging functionality into the messaging application.

While the foregoing description includes techniques to provide suggested responses in response to receiving an image, suggested responses may be provided in response to any type of media content that is received in a conversation. For example, such content may include stickers (e.g., in a chat application), animated images (e.g., cinemagraphs, GIF images, etc.), and videos. Further, while the foregoing description describes suggested responses as text responses, other types of responses may also be suggested, e.g., based on analysis of a received image. For example, other responses may include one or more of a suggested image, a suggested sticker, a suggested animated image (e.g., cinemagraph, GIF image, etc.) and a suggested video. To provide these suggestions, suggestion module 304 may perform, e.g., a comparison of identified concepts in a received item (e.g., text, image, video, sticker, animated image, etc.) with concepts in different types of responses, and select a suitable response, as described above with reference to suggested responses that include text. In different implementations where users provide consent, the type of response may be selected or prioritized based on context, e.g., a sticker may be selected as a suggested response in response to an incoming sticker, a video may be selected as a suggested response in response to an incoming image, etc.

Certain implementations enable messaging with human users and/or chat bots. In certain implementations, automatic message suggestions may be customized based on whether a chat bot is participating in the messaging conversation. In some examples, a first set of automatic message suggestions may be provided if a chat bot is absent in a messaging conversation, while a second set of automatic suggested messages may be provided if a chat bot is present in the messaging conversation, where the first and second sets of responses are at least partially different. For example, these implementations may employ conversational rules followed by the chat bot, and suggest messages to a user based on the rules. This can mitigate challenges that users may have in communicating with chat bots in a language and in a format that is easily understood by the chat bots.

Some implementations can include determining one or more trending responses (e.g., message responses including popular message content sent by many different users) based on other messages in at least one of a region, market, and country related to a location of a user. One or more determined suggested responses may include one or more trending responses. In some implementations, a user context, e.g., a geographic location, holiday or an event, etc., can be used to generate and determine for presentation one or more of the suggested responses.

In some implementations, determining one or more suggested responses may be based on using machine learning to develop a personalized model for a user. Determining suggested responses may be based on preferences of the user and/or prior actions of the user in communications (if user consent for use of such actions and data has been obtained). For example, user preferences may include a whitelist indicating particular words which can be included and/or a blacklist indicating particular words which cannot be included in message suggestions. If user consent has been obtained, message suggestions can be generated or modified based on one or more of punctuation use, emoji use, or other content provided by the user on previous occasions.

Models used to provide suggested responses, e.g., a conditioned language model as described above, may be implemented by a client device 115 and/or a server, e.g., server 101 and/or response generator 150. In some implementations, conversations may be encrypted such that only client devices of participants in the conversation can access conversation content. In these implementations, models implemented by a respective client device may be used to provide suggested responses and models implemented by a server are not used. Models implemented by a client device may also be used, e.g., when the user does not provide consent for use of models implemented by a server. In some implementations, client implemented models may be based on or derived from server implemented models. In some implementations, server models may be used and client models may not be used, e.g., when a client device lacks capability to implement client models. In some implementations, a combination of client and server models may be used.

While the examples described in this document utilize concepts illustrated in English, suggestions may be provided in any language, e.g., a language, locale or other geographic configured for a client device 115, a language selected based on a user preference, etc. In some implementations, where users provide consent for analysis of context of a conversation, a language that is used in various conversations (e.g., in recent messages) involving the user may be detected and message suggestions can be provided in that language.

In some implementations, multiple conditioned language models can be stored, trained, and utilized according to one or more features described herein. In some examples, each conditioned language model can be trained and used with words and responses of a particular human-used language. For example, a first conditioned language model can be trained specifically with English responses and a second conditioned language model can be trained specifically with Hindi responses. In some implementations, one of the multiple available conditioned language models can be selected for use during runtime based on a language that is determined for a current user messaging conversation. For example, if user consent has been obtained, previous messages in the user's current conversation (e.g., messages within a predetermined amount of time previous to the current message, or a predetermined number of the last messages sent) can be retrieved (e.g., from messaging application database 199) and a language of the conversation detected by the system, e.g., based on the words used and accessing language data from accessible storage. If the detected language matches the language of an available conditioned language model, then the matching conditioned language model is selected for use to programmatically generate one or more suggested responses to an image as described herein.

In some implementations, multiple conditioned language models can be used to generate responses to a particular image. For example, the received image can be input to a first conditioned language model and to a second conditioned language model, and the responses from both models are used in the resulting set of suggested responses. In some implementations, a single conditioned language model can be trained and used to provide responses for multiple languages, e.g., responses provided in multiple languages are used in the training of the conditioned language model.

Figure 12:
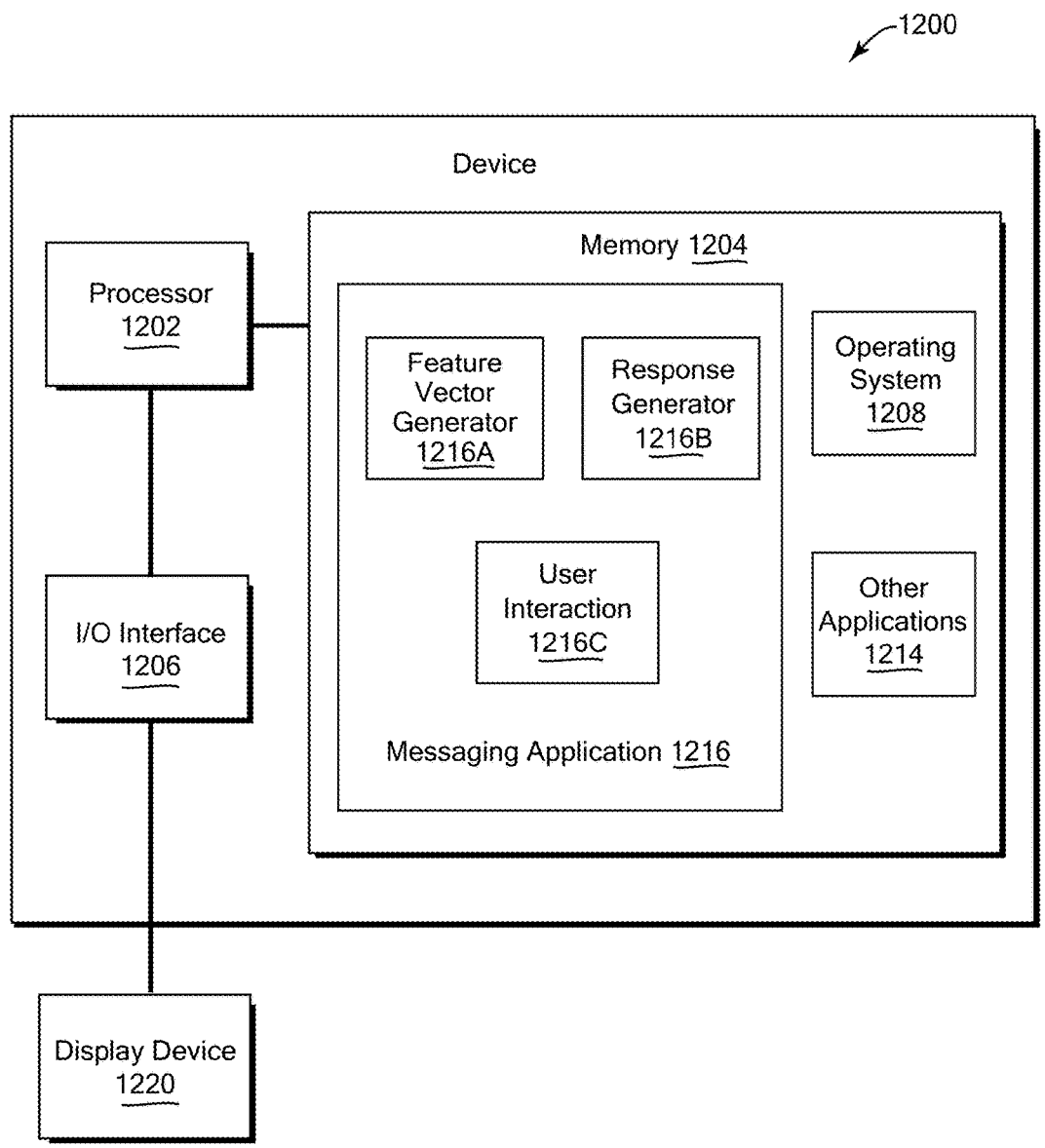
FIG. 12 is a block diagram of an example device which may be used for one or more implementations described herein.

FIG. 12 is a block diagram of an example device 1200 which may be used to implement one or more features described herein. In one example, device 1200 may be used to implement a client device, e.g., any of client devices 115 shown in FIG. 1. Alternatively, device 1200 can implement a server device, e.g., messaging server 101, concept identifier 120, and content classifier 130 of FIG. 1. Device 1200 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1200 includes a processor 1202, a memory 1204, and input/output (I/O) interface 1206. Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1208, messaging application 1216 and other applications 1214 such as a data display engine, web hosting engine, image display engine, notification engine, social networking engine, etc. In some implementations, the messaging application 1216 can include instructions that enable processor 1202 to perform functions described herein, e.g., some or all of the method of FIG. 2. For example, messaging application 1216 can provide message suggestions as described herein. In some implementations, messaging application 1216 may include one or more modules, such as feature vector generator 1216A, response generator 1216B, and user interaction module 1216C, and/or these modules can be implemented in other applications or devices in communication with the device 1200. One or more of the applications can, for example, provide a displayed user interface responsive to user input to display selectable options or controls, and data based on selected options. Other applications or engines 1214 can also or alternatively be included, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 1204 can alternatively be stored on any other suitable storage location or computer-readable medium. In addition, memory 1204 (and/or other connected storage device(s)) can store one or more messages, one or more taxonomies, electronic encyclopedia, dictionaries, thesauruses, message data, grammars, user preferences, and/or other instructions and data used in the features described herein. Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. Interfaced devices can be included as part of the device 1200 or can be separate and communicate with the device 1200. For example, network communication devices, storage devices (e.g., memory and/or database 106), and input/output devices can communicate via I/O interface 1206. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 1206 can include a display device 1220 that can be used to display content, e.g., images, video, and/or a user interface of an output application as described herein. Display device 1220 can be connected to device 1200 via local connections (e.g., display bus) and/or via networked connections and can be any suitable display device. The display device 1220 can include any suitable display device such as an LCD, LED, or plasma display screen, CRT, television, monitor, touchscreen, 3-D display screen, or other visual display device. For example, display device 1220 can be a flat display screen provided on a mobile device, multiple display screens provided in a goggles device, or a monitor screen for a computer device.

The I/O interface 1206 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 12 shows one block for each of processor 1202, memory 1204, I/O interface 1206, and software blocks 1208, 1214, and 1216. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While some components are described as performing blocks and operations as described in some implementations herein, any suitable component or combination of components of environment 100, device 1200, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of automatically suggesting content in a messaging application, the method comprising:
   detecting an image posted within a first message by a first user;
   programmatically analyzing the image to determine a feature vector representative of the image;
   programmatically generating one or more suggested responses to the first message based on the feature vector, the one or more suggested responses each being a conversational reply to the first message, wherein programmatically generating the one or more suggested responses includes:
      determining probabilities associated with word sequences for the feature vector using a model trained with previous responses to previous images; and
      selecting one or more word sequences of the word sequences based on the probabilities associated with the word sequences, wherein the one or more suggested responses are determined based on the selected one or more word sequences, wherein selecting the one or more word sequences includes selecting at least one word sequence that is weighted based on a similarity to a previous message response provided by a second user; and
   causing the one or more suggested responses to be rendered in the messaging application as one or more suggestions to the second user.

2. The method of claim 1 wherein causing the one or more suggested responses to be rendered includes transmitting a command to render the one or more suggested responses in the messaging application.

3. The method of claim 1 wherein the probabilities include a probability of each word in a stored vocabulary to be the next word in one of the one or more word sequences, wherein selecting the one or more word sequences includes selecting a number of the one or more word sequences associated with one or more highest probabilities of the determined probabilities.

4. The method of claim 1 wherein the model is a conditioned language model and wherein determining the probabilities associated with the word sequences includes inputting the feature vector to the conditioned language model.

5. The method of claim 4 wherein the conditioned language model uses a long-short term memory (LSTM) network.

6. The method of claim 1 wherein selecting the one or more word sequences includes using a beam search technique.

7. The method of claim 1 wherein each of the one or more word sequences is used by the model as a word embedding encoding words included in the word sequence and the feature vector.

8. The method of claim 1 wherein the one or more word sequences are determined from a plurality of words in a vocabulary that is determined from the previous responses, wherein determining the probabilities associated with the word sequences includes iteratively determining, for each word sequence, a probability of each word in the vocabulary to be the next word in the word sequence.

9. The method of claim 1 wherein the previous responses are selected from a larger set of responses to the previous images, wherein the previous responses are more specific to particular content of the previous images than other previous responses of the larger set of responses.

10. The method of claim 1 wherein the model is a conditioned language model, and wherein selecting the one or more word sequences includes iteratively:
feeding the feature vector and a previous word sequence to the conditioned language model to determine a set of new word sequences and the probabilities associated with the new word sequences based on the feature vector and the previous word sequence, where one or more of the new word sequences have at least one additional word with respect to the previous word sequence; and
selecting a subset of the set of new word sequences based on the probabilities associated with the new word sequences and selecting one word sequence of the selected subset as the previous word sequence for a next iteration.

11. The method of claim 1, further comprising:
upon the second user selecting the suggested response, posting the suggested response as a message response to the first message.

12. The method of claim 1, further comprising:
checking whether each of the one or more word sequences is present in a whitelist of word sequences,
wherein the selected one or more word sequences are present on the whitelist.

13. The method of claim 1, wherein the at least one word sequence is weighted higher based on the similarity to the previous message response provided by the second user.

14. The method of claim 4 further comprising:
providing the conditioned language model as a first conditioned language model specific to a first language;
providing a second conditioned language model specific to a second language;
determining that a language for a message conversation in which the first message is received is the first language; and
selecting the first conditioned language model to be used in the programmatically generating one or more suggested responses.

15. A system to automatically suggest content in a messaging application comprising:
a memory; and
at least one processor configured to access the memory and configured to perform operations comprising:
detecting an image posted within a first message by a first user;
programmatically analyzing the image to determine a feature vector representative of the image;
programmatically generating one or more suggested responses to the first message based on the feature vector, the one or more suggested responses each being a conversational reply to the first message, wherein programmatically generating the one or more suggested responses includes:
determining probabilities associated with word sequences for the feature vector using a model trained with previous responses to previous images;
selecting one or more word sequences of the word sequences based on the probabilities associated with the word sequences, wherein the one or more suggested responses are determined based on the selected one or more word sequences, wherein selecting the one or more word sequences includes selecting at least one word sequence that is weighted based on a similarity to a previous message response provided by a second user; and
causing the one or more suggested responses to be rendered in the messaging application as one or more suggestions to the second user.

16. The system of claim 15 wherein the model is a conditioned language model, and wherein the operation of selecting the one or more word sequences includes iteratively:
feeding the feature vector and a previous word sequence to the conditioned language model to determine a set of new word sequences and the probabilities associated with the new word sequences based on the feature vector and the previous word sequence, where one or more of the new word sequences have at least one additional word with respect to the previous word sequence; and
selecting a subset of the set of new word sequences based on the probabilities associated with the new word sequences and selecting one word sequence of the selected subset as the previous word sequence for a next iteration.

17. The system of claim 15 wherein the previous responses are selected from a larger set of responses to the previous images, wherein the previous responses are more specific to particular content of the previous images than other previous responses of the larger set of responses.

18. The system of claim 15 wherein the model is a conditioned language model that is conditioned by the feature vector received as an input and uses a long-short term memory (LSTM) network.

19. A non-transitory computer readable medium having stored thereon software instructions that, when executed by a processor, cause the processor to automatically provide suggested content by performing operations including:
detecting an image posted within a first message by a first user;
programmatically analyzing the image to determine a feature vector representative of the image;
programmatically generating one or more suggested responses to the first message based on the feature vector, the one or more suggested responses each being a conversational reply to the first message, wherein programmatically generating the one or more suggested responses includes:
determining probabilities associated with word sequences for the feature vector using a model trained with previous responses to previous images, wherein the previous responses are selected from a larger set of responses to the previous images, wherein the previous responses are more specific to particular content of the previous images than other previous responses of the larger set of responses;

selecting one or more word sequences of the word sequences based on the probabilities associated with the word sequences, wherein the one or more suggested responses are determined based on the selected one or more word sequences; and outputting the one or more suggested responses to be rendered in a messaging application as one or more suggestions to a user.

20. The computer readable medium of claim 19 wherein the model is a conditioned language model that is conditioned by the feature vector received as an input, wherein the conditioned language model uses a long-short term memory (LSTM) network.

* * * * *